(12) United States Patent
Dosluoglu

(10) Patent No.: US 8,310,724 B2
(45) Date of Patent: Nov. 13, 2012

(54) APPARATUS AND METHOD FOR SHIFT INVARIANT DIFFERENTIAL (SID) IMAGE DATA INTERPOLATION IN FULLY POPULATED SHIFT INVARIANT MATRIX

(75) Inventor: Taner Dosluoglu, New York City, NY (US)

(73) Assignee: Youliza, Gehts B.V. Limited Liability Company, Dover, DE (US)

( * ) Notice: Subject to any disclaimer, the term of this patent is extended or adjusted under 35 U.S.C. 154(b) by 0 days.

(21) Appl. No.: 13/231,897

(22) Filed: Sep. 13, 2011

(65) Prior Publication Data

US 2012/0002874 A1    Jan. 5, 2012

Related U.S. Application Data

(63) Continuation of application No. 11/998,099, filed on Nov. 28, 2007, now Pat. No. 8,040,558.

(60) Provisional application No. 60/861,866, filed on Nov. 30, 2006.

(51) Int. Cl.
*H04N 1/60* (2006.01)

(52) U.S. Cl. ......... 358/1.9; 358/505; 358/509; 358/513; 358/514; 382/162; 382/190; 382/192; 382/276; 382/277; 382/312; 348/230.1; 348/238; 348/272; 348/294; 348/298

(58) Field of Classification Search .................. None
See application file for complete search history.

(56) References Cited

U.S. PATENT DOCUMENTS

| | | | |
|---|---|---|---|
| 3,971,065 A | 7/1976 | Bayer | |
| 4,093,874 A | 6/1978 | Pollitt | |
| 5,949,483 A | 9/1999 | Fossum et al. | |
| 6,081,671 A * | 6/2000 | Nakahara et al. | 396/96 |
| 6,104,844 A | 8/2000 | Alger-Meunier | |
| 6,381,072 B1 * | 4/2002 | Burger | 359/622 |
| 6,493,029 B1 | 12/2002 | Denyer et al. | |
| 6,507,364 B1 | 1/2003 | Bishay et al. | |
| 6,618,503 B2 | 9/2003 | Hel-or et al. | |
| 6,690,424 B1 | 2/2004 | Hanagata et al. | |
| 6,801,719 B1 * | 10/2004 | Szajewski et al. | 396/333 |
| 6,822,758 B1 | 11/2004 | Morino | |
| 6,831,692 B1 * | 12/2004 | Oda | 348/315 |

(Continued)

OTHER PUBLICATIONS

Image processing, Solution methods, from Wikipedia, the free encyclopedia, found hppt://web.archive.org/web/20051218193836/http://en.wikipedia.org/wiki/images_processing.

(Continued)

*Primary Examiner* — Dung Tran
(74) *Attorney, Agent, or Firm* — Stolowitz Ford Cowger LLP

(57) ABSTRACT

An image processing system for interpolating image data is comprised of a shift invariant point determining device, an illumination averager, a second order differentiator, and color data calculator. The shift invariant point determining device ascertains shift invariant points within the mosaic color element array pattern. The illumination averager determines average illumination values of clusters of a plurality of pixels. The second order differentiator determines a second order derivative of the average illumination values of the clusters of the plurality of pixels. The color data calculator determines color data for each of the plurality of pixels from the image data and second order derivative. A second order derivative scaler multiplies the second order derivative by a scaling factor for selectively smoothing and sharpening the second order derivative. A color data averager averages color data values of adjacent pixels to a resolution of the image data.

20 Claims, 15 Drawing Sheets

U.S. PATENT DOCUMENTS

| | | | |
|---|---|---|---|
| 6,903,754 | B2 | 6/2005 | Brown-Elliott |
| 7,049,860 | B2 | 5/2006 | Gupta |
| 7,119,903 | B1 | 10/2006 | Jones |
| 7,280,141 | B1 | 10/2007 | Frank et al. |
| 7,440,016 | B2 | 10/2008 | Keshet et al. |
| 7,460,688 | B2 | 12/2008 | Stanback et al. |
| 7,479,994 | B2 | 1/2009 | Yang et al. |
| 7,511,749 | B2 * | 3/2009 | Gruhlk et al. ............. 348/272 |
| 7,515,183 | B2 | 4/2009 | Yang et al. |
| 7,548,261 | B2 | 6/2009 | Yang et al. |
| 7,561,189 | B2 | 7/2009 | Chien et al. |
| 7,639,291 | B2 | 12/2009 | Lim et al. |
| 7,704,781 | B2 * | 4/2010 | McKee ............. 438/70 |
| 2003/0169353 | A1 | 9/2003 | Keshet et al. |
| 2003/0227311 | A1 | 12/2003 | Ranganathan |
| 2005/0031222 | A1 | 2/2005 | Hel-Or |
| 2006/0113459 | A1 | 6/2006 | Yang et al. |
| 2008/0166063 | A1 * | 7/2008 | Zeng ............. 382/260 |

OTHER PUBLICATIONS

Image processing, typical operations, from Wikipedia, the free encyclopedia, found hppt://et.wikipedia.org/wiki/image_processing.

"Image Capture: Modeling and Calibration of Sensor Responses and Their Synthesis from Multispectral Images," Vora et al. Hewlett Packard Laboratories, HPL-98-187 found Mar. 29, 2006 at http://www.hjpl.hp.com/techreports/98/HPL-98-187.pdf.

Interpolation in Non-Fully Populated Shift Invariant Matrix; assigned to the same assignee as the present invention.

"Pixel-Level Image Fusion: the Case of Image Sequences"; Rockinger et al. Proceeding of SPIE (The International Society for Optical Engineering).

Signal Processing, Sensor Fusio, and Target Recognition VII, vol. 3374, pp. 378-388, Jul. 1998.

"Method of Color Interpolation in a Single Color Camera Using Green Channel Separation", Weerasinghe, et al. IEEE International conference on Acoustics, Speech and Signal Processing, 2002, ol 4, pp. IV-3233-IV-3236.

"The Canonical Correlations of Color Images and Their Use for Demosaicing", Hel-Or, Hewlett Packard Laboratories, HPL-2003-164R1, Feb. 23, 2004, found: Mar. 29, 2006 at www.hpl.hjp.com/techreports/2003/HPL-2003-164R1.pdf.

"Local Image Reconstruction and Sub-pixel Restoration Algorithms," Boult et al., Computer Vision, Graphics and Image Processing: Graphical Models and Image Processing, vol. 55, No. 1, 1993, pp. 63-77, Academic Press, Inc. Orlando, FL.

Stolowitz Ford Cowger LLP; Related Case Listing; Sep. 13, 2011; 1 Page.

* cited by examiner

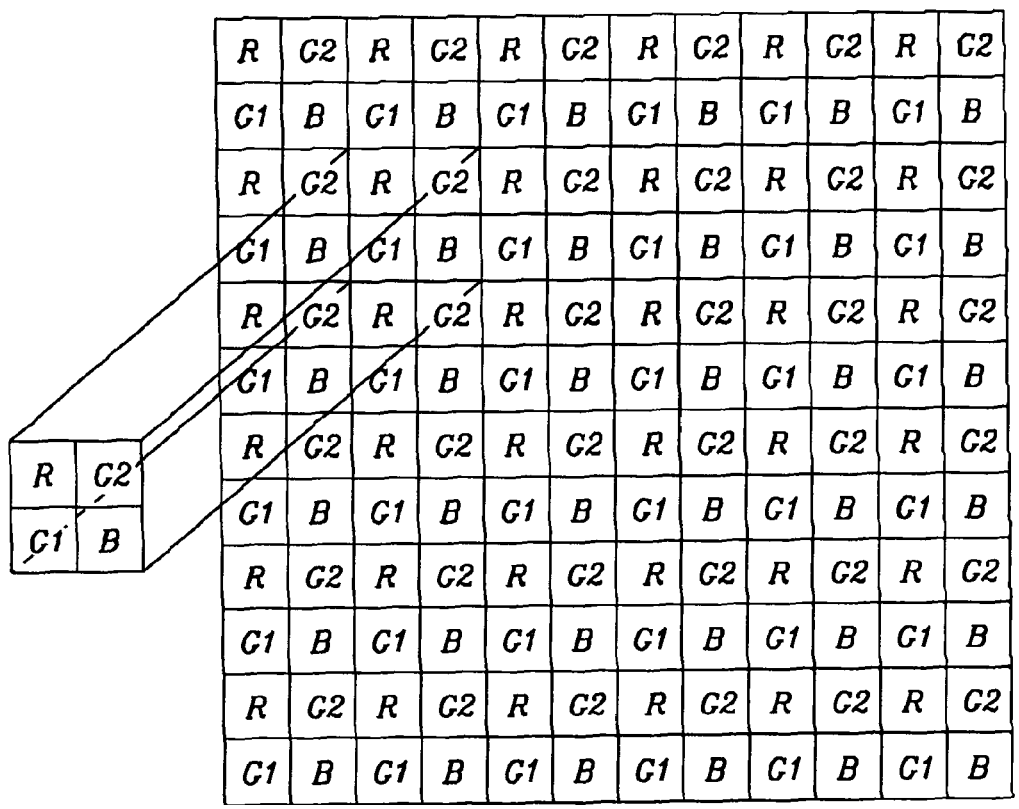
FIG. 1 - Prior Art

APPARATUS AND METHOD FOR SHIFT INVARIANT DIFFERENTIAL (SID) IMAGE DATA INTERPOLATION IN FULLY POPULATED SHIFT INVARIANT MATRIX

RELATED PATENT APPLICATIONS

This application is a continuation of and claims priority to U.S. patent application Ser. No. 11/998,099, filed Nov. 28, 2007, now issued as U.S. Pat. No. 8,040,558, which claims priority under 35 U.S.C. §119 to U.S. Provisional Patent Application Ser. No. 60/861,866, filed Nov. 30, 2006, all of which is herein incorporated by reference in its entirety.

"An Apparatus and Method for Shift Invariant Differential (SID) Image Data Interpolation in Non-Fully Populated Shift Invariant Matrix", U.S. patent application Ser. No. 11/998,127, filed Nov. 28, 2007, assigned to the same assignee as this invention and incorporated herein by reference.

BACKGROUND OF THE INVENTION

1. Field of the Invention

This invention relates generally to an image processing methods and apparatus. More particularly, this invention relates to image processing methods and apparatus for interpolation of image data of a mosaic structured color element array. Even more particularly, this invention relates to image processing methods and apparatus that employ a second order derivative calculated at a shift invariant point of a mosaic structured color element array to determine color values be independent of the location chosen at intervals of maximum spatial sampling frequency.

2. Description of Related Art

A digital image is an electronic signal representing the intensity or intensity of light reflected or originating from an object impinging upon a sensor. The light is converted within the sensor to an electronic signal. In an image sensor array, the electronic signal contains information detailing the intensity of the light impinging upon a two-dimensional array. Thus, the electronic signal contains the intensity of each point having a sensor within the array as defined as a function of two spatial variables. Further, each point having a sensor is considered a sampling point and the space between each of the sensors determines the maximum spatial sampling frequency of the image. Thus projected images of these sensor outputs such as photographs, still video images, radar images, etc. are a function of the spatial variables (x,y), therefore the image intensity is defined as f(x,y).

U.S. Pat. No. 6,822,758 (Morino) describes an image processing method for improving a defective image (degraded image) using color interpolation and optical correction.

"Pixel-Level Image Fusion: The Case of Image Sequences", Rockinger, et al, Proceedings of SPIE (The International Society for Optical Engineering), Signal Processing, Sensor Fusion, and Target Recognition VII, Vol. 3374, pp.: 378-388, July 1998, provides a pixel-level image sequence fusion with an approach based on a shift invariant extension of the 2D discrete wavelet transform. The discrete wavelet transform yields an over-complete and thus shift invariant multi-resolution signal representation.

"Method of Color Interpolation in A Single Sensor Color Camera Using Green Channel Separation", Weerasinghe, et al, IEEE International Conference on Acoustics, Speech, and Signal Processing, 2002, Vol.: 4, pp.: IV-3233-IV-3236 presents a color interpolation algorithm for a single sensor color camera. The proposed algorithm is especially designed to solve the problem of pixel crosstalk among the pixels of different color channels. Inter-channel crosstalk gives rise to blocking effects on the interpolated green plane, and also spreading of false colors into detailed structures. The proposed algorithm separates the green channel into two planes, one highly correlated with the red channel and the other with the blue channel. These separate planes are used for red and blue channel interpolation.

"The Canonical Correlations of Color Images and Their Use for Demosaicing", Hel-Or, Hewlett Packard Laboratories, HPL-2003-164R1, Feb. 23, 2004, found: Mar. 29, 2006 at www.hpl.hp.com/techreports/2003/HPL-2003-164R1.pdf, describes a demosaicing technique that is derived directly from statistical inferences on color images for demosaicing color image de-noising, compression, and segmentation. The technique presents a Bayesian approach that exploits the spectral dependencies in color images. It takes advantage of the fact that spatial discontinuities in different color bands are correlated and that this characteristic is efficiently exposed using the Canonical Correlation Analysis (CCA). The CCA scheme optimally represents of each color band such that color plane correlation is maximized.

"Local Image Reconstruction and Sub-pixel Restoration Algorithms", Boult et al, Computer Vision, Graphics, and Image Processing: Graphical Models and Image Processing, Vol.: 55, No.: 1, 1993, pp.: 63-77, Academic Press, Inc., Orlando, Fla., introduces a new class of reconstruction algorithms that treat image values as area samples generated by non-overlapping integrators. This is consistent with the image formation process, particularly for CCD and CID cameras. Image reconstruction is a two-stage process: image restoration followed by application of the point spread function (PSF) of the imaging sensor.

"Image Capture: Modeling and Calibration of Sensor Responses and Their Synthesis from Multispectral Images", Vora, et al, Hewlett Packard Laboratories, HPL-98-187, found Mar. 29, 2006, models for digital cameras, methods for the calibration of the spectral response of a camera and the performance of an image capture simulator. The general model underlying the simulator assumes that the image capture device contains multiple classes of sensors with different spectral sensitivities and that each sensor responds in a known way to light intensity over most of its operating range.

SUMMARY OF THE INVENTION

An object of this invention is to provide a system that interpolates image data using a second order derivative at a shift invariant point within a cluster of pixels to prevent uniform illumination interference and color shifting from various edges and shapes within an image.

Another object of this invention is to scale the second order derivative to smooth or sharpen the image.

Further, another object of this invention is further sharpening the color data derived from the second order derivative.

To accomplish at least one of these objects, an image processing system for interpolating image data is comprised of a shift invariant point determining device, an illumination averager, a second order differentiator, and color data calculator. The shift invariant point determining device ascertains shift invariant points within said mosaic color element array pattern. The illumination averager receives image data representing the image to determine average illumination values of clusters of a plurality of pixels. The plurality of pixels is organized to form the image and the image data containing illumination values for each of the plurality of pixels. The second order differentiator is in communication with the illumination averager to receive the average illumination values for the clusters of the plurality of pixels to determine a second order derivative of the average illumination values of the clusters of the plurality of pixels. The color data calculator receives the image data and is in communication with the second order differentiator to receive the second order derivative. From the image data and second order derivative, the color data calculator determines color data for each of the plurality of pixels.

The image processing system additionally has a second order derivative scaler in communication with the second order differentiator to receive the second order derivative. The second order derivative scaler the multiplies the second order derivative by a scaling factor for selectively smoothing and sharpening the second order derivative.

The image processing system further has a color data averager. The color data averager is in communication with the color data calculator to average color data values of adjacent pixels to a resolution of the image data. An average color data memory device is in communication with the color data averager to receive and retain the average color data values. The image processing system includes an output device in communication with the average color data memory device for transferring the average color data values to an external apparatus for further processing.

A raw image data memory receives and retains the image data in communication with the illumination averager to transfer the image data to the illumination averager. An average illumination data memory is in communication with the illumination averager to receive and retain the average illumination values of the clusters.

The illumination values maybe light intensity of the clusters of the plurality of color elements at the shift invariant points or average luminance of the clusters of the plurality of color elements at the shift invariant points. The illumination values maybe for the interpolation maybe the results using any variety of weighting factors in the calculations of luminance of the clusters of the plurality of color elements at the shift invariant points.

The shift invariant point determining device ascertains shift-invariance of a point within the mosaic color element array pattern is satisfied by the logical statement:

IF $I(n,m)=T[a*X1(n,m)+b*X2(n,m)+c*X3(n,m)+d*X4(n,m)]$

THEN $I(n-k,m-l)=T[a*X1(n-k,m-l)+b*X2(n-k,m-l)+c*X3(n-k,m-l)+X4(n-k,m-l)]$ where:
I(n,m) is the intensity of an element n,m of the mosaic color element array pattern;
T is a function of the variables of each element of the mosaic color element array pattern;
X1, . . . , Xn are the elements for each row of the mosaic color element array pattern;
n and m are discreet values 1, . . . , N and 1, . . . , M that identifies the location of an element within the mosaic color element array pattern having dimensions N×M;
k and l are incremental counting values that identifies the location of an element within the mosaic color element array pattern a distance k and l from element n and m of the mosaic color element array pattern.
a, b, c, and d are scaling factors for the elements X1, . . . , Xn.

The illumination averager determines the average illumination values by the formula:

$$\overline{I(2i,2j)} = \frac{\sum_{x=0}^{+1}\sum_{y=0}^{+1} I((2*(i-x)-1),(2*(j-y)-1))}{4}$$

where:
$\overline{I(2i,2j)}$ is the average illumination value at the shift invariant locations within the cluster.
$I((2*(i-x)-1),(2*(j-y)-1))$ is the illumination of an $x^{th}$ and $y^{th}$ color element within the cluster centered on the interstitial space (2i,2j).

The second order differentiator determines second order derivative by the formula:

$\overline{I(2i,2j)}''=2*[(\text{Average Peripheral Pixels})-(\text{Average Center Cluster Pixels})]$ where:
$\overline{I(2i,2j)}''$ is the second order derivative.

The above formula is simplified to determine the second order by the formula:

$$I(i,j)'' = \frac{A+B+C}{6} - \frac{(I_{C4}(2i+1,2j-1)+I_{C3}(2i+1,2j+1)+I_{C2}(2i-1,2j-1)+I_{C1}(2i-1,2j+1))}{2}$$

Where:

$A=I_{C1}(2i+3,2j-3)+I_{C2}(2i+3,2j+3)+I_{C3}(2i-3,2j-3)+I_{C4}(2i-3,2j+3)$ $B=I_{C2}(2i+3,2j-1)+I_{C1}(2i+3,2j+1)+I_{C3}(2i-1,2j-3)+I_{C1}(2i-1,2j-3)$ $C=I_{C4}(2i+1,2j+3)+I_{C2}(2i-1,2j+3)+I_{C4}(2i-3,2j-1)+I_{C3}(2i-3,2j+1)$ $I_{C1}$ is the first color of a four mosaic color element array cluster.
$I_{C2}$ is the second color of a four mosaic color element array cluster.
$I_{C3}$ is the third color of a four mosaic color element array cluster.
$I_{C4}$ is the fourth color of a four mosaic color element array cluster.

The second derivative scaler determines the smoothed and sharpened second order derivative by the formula:

$$\overline{Iss}'' = \frac{(\overline{I(2i,2j)})''}{\text{Scale\_Sharp\_Smooth}}$$

where:
$\overline{Iss}''$ is said smoothed and sharpened second order derivative,
$\overline{I(2i,2j)}''$ is said second order derivative, and
Scale_Sharp_Smooth is said scaling factor.

The color data calculator determines the color data by the formula:

$I_{CX}(2i,2j)=I_{cx}(2i-l,2j-m)+I(2i,2j)/2-I(2i-2*l,2j-2*m)/2-I(2i,2j)*/8$ where:
x is the designation of the color element type;
l and m are +/−1 depending on color element type.

The color data averager determines the average color data values by the formula:

$$\overline{I_c(2i-1, 2j-1)} = \frac{\left|\sum_{x=0}^{1}\sum_{y=0}^{1} I_c((2*(i-x)-2), (2*(j-y)-2))\right|}{4}$$

$$C = Ca, Cb, Cc, Cd$$

where:
$\overline{I_c(2i-1,2j-1)}$ is the average color data,
$I_C((2*(i-x)-2),(2*(j-y)-2))$ is the calculated color data for each junction of one color element (C), and
x and y are counting variables for the respectively dimensions i, and j of the plurality of color elements.

BRIEF DESCRIPTION OF THE DRAWINGS

FIG. 1 is a diagram illustrating a Bayer patterned color image sensor array of the prior art.

DETAILED DESCRIPTION OF THE INVENTION

Figure 2A:
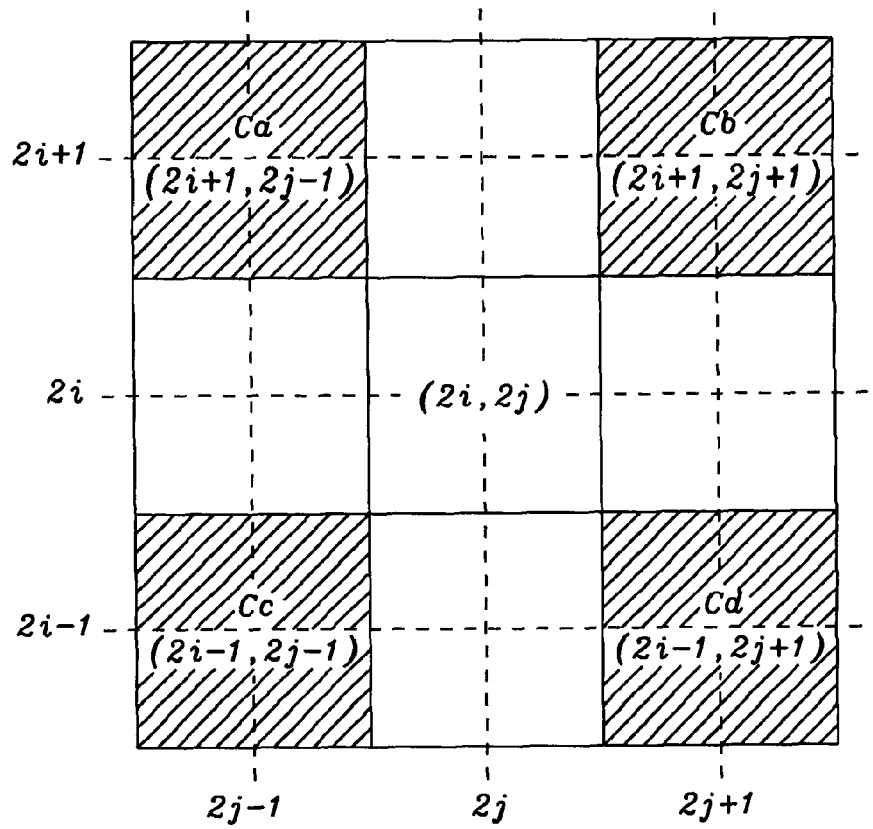
FIGS. 2a-2c are diagrams of portions of an image constructed of Bayer patterned pixel illustrating the indexing structure of the apparatus and method of this invention interpolates image data.

Image sensor elements (either CMOS or Charged Coupled Devices) generally sense light as a grey-scaled value. Alternately, the pixel sensor elements, as described, are tuned to be sensitive to a particular hue of the color. If the pixel sensor elements sense only grey scale values they require a color filter array to generate the color components that are to be displayed. The color filter mosaic array, such as the Bayer pattern as shown in U.S. Pat. No. 3,971,065 (Bayer), provide the raw color data information for an image. Refer to FIG. 1 for a description of a Bayer pattern mosaic color element array. The first green hue pattern, having elements denoted by G1, assumes every other array position with the red hue pattern (R) of a given row. The second green hue pattern (G2) assumes an every other array position and alternates with the blue hue pattern (B) in alternate rows. The maximum spatial sampling frequency of a Bayer pattern color filter mosaic array is the pitch in the horizontal (x) direction and the vertical (y) direction between the centers of the color elements R, G1, G2, and B of the Bayer pattern. In the case of pixel sensor elements detecting the grey scale values, the Bayer pattern color filter mosaic array will be a discrete dyed coating. In the case of those pixel sensor elements capable of sensing the discrete color components, the pixel sensor elements have their sensitivities tuned to receive specific colors and the pixel sensor elements are arranged in the Bayer pattern. One significant characteristic of sensors such as the Bayer patterned sensors is that adjacent pixels appear to contribute significantly to the response of their neighbors.

The color element mosaic pattern of image arrays such as a Bayer pattern introduces a shift-variance. Shift-variance means that the interpolation at a specific spatial location (x,y) is different. That is color data for a specified input RGB(x,y) is not always equal to RGB(x−dx,y−dy), where dx and dy are any integer multiple of the pixel pitch. That is if there is an edge or dramatic change of intensity between any two adjacent pixels of the same color, the raw color data does not contain for one of the colors the precise information for the exact location of the edge and any interpolation for determining intermediate color between the two same color does not determine the location of the change intensity.

A shift invariant system occurs when identical stimulus is presented to the system except for the corresponding shift in time or space and the response of the system is identical. Mathematically, a system T is shift-invariant if and only if:

$$y(t)=T[x(t)] \text{ implies } y(t-s)=T[x(t-s)]$$

Where
y(t) is the response of the system.
T[x(t)] is the system description.
x(t) is the input stimulus of the system T.
(t−s) is the shift in time or space.

The intensity or magnitude of the color data between two pixels is, as shown above, shift variant. However, the intensity I(x,y) calculated by summing all four adjacent pixels is shift-invariant. That is for a specified input of a four pixel cluster of an image array, the intensity is determined by the formula:

$$\sum_{x=0}^{2}\sum_{y=0}^{2} I(x, y) = \sum_{x=0}^{2}\sum_{y=0}^{2} I(x-dx, y-dy)$$

The Red/Green/Blue structure of the Bayer pattern, as used in CMOS active pixel image sensors, results in a periodic structure that is not shift invariant. For an imaging system it is desired to have an output that is shift invariant (i.e. the edges in the picture can be located at anywhere). However, the total illumination intensity at interstitial space between four adjacent pixels of the Bayer pattern can always be represented by two green, one red, and one blue pixel that are adjacent. This is true for all interstitial spaces of any 2×2 arrangements of four pixels of the Bayer pattern regardless of the relative position of Blue/Red pixels with respect to the interstitial space location.

As discussed in the Wikipedia entry on image processing (found May 3, 2006), image processing provides solutions to such processing as:

geometric transformations (enlargement, reduction, and rotation); color corrections (brightness and contrast adjustments, quantization, or conversion to a different color space);

registration or alignment of two or more images;

combination of two or more images into an average, blend, difference, or image composite;

interpolation, demosaicing, and recovery of a full image from a raw image format like a Bayer filter pattern;

segmentation of the image into regions;

image editing and digital retouching; and extending dynamic range by combining differently exposed images (generalized signal averaging of Wyckoff sets).

For the interpolation, demosaicing, and recovery of a full image, the interpolation algorithms become complicated as they try to adapt to various edges and shapes that might interfere with the uniform illumination and causes color shifts. The apparatus and method of this invention determines the average intensity for locations with a spatial sampling rate that is the minimum pixel pitch of the mosaic structured color element array pattern. The average intensity is determined for each interstitial space between four adjacent pixels of an array. The apparatus and method of this invention then determines the second order derivative of the average illumination for each of the interstitial spaces between each four pixels of the image array. The second order derivative, as calculated at the center interstitial space of any 2×2 pixel arrangement, is shift invariant when the total illumination is considered. This second order derivative is then used together with the adjacent color information to determine the interpolated color information for each of the Bayer pattern pixel clusters.

The apparatus and method of this invention further provides sharpening and smoothing of the image by scaling the second order derivative. The calculated color data for all the interstitial spaces adjacent to each pixel is averaged to further sharpen the image.

The raw image data with a mosaic structured color element array pattern, such as the Bayer pattern is a two dimensional array. In a two dimensional array has the general mathematical formulation with a function T having the variables x1(n, m)...xn(n,m). This a function 1(n,m) has the form written as:

$$I(n,m)=T[a*x1(n,m)+b*x2(n,m)+c*x3(n,m)+d*x4(n,m)+\ldots z*xn(n,m)]$$

Where:

T is the function of the variables of each element x1, ..., xn are the elements for each row of the two dimensional array. For the Bayer pattern mosaic structured color element array pattern, each element refers to the original pixel data.

n and m are discreet values 1, ..., N and 1, ..., M that identifies the location of an element within the N×M array.

Figure 2B:
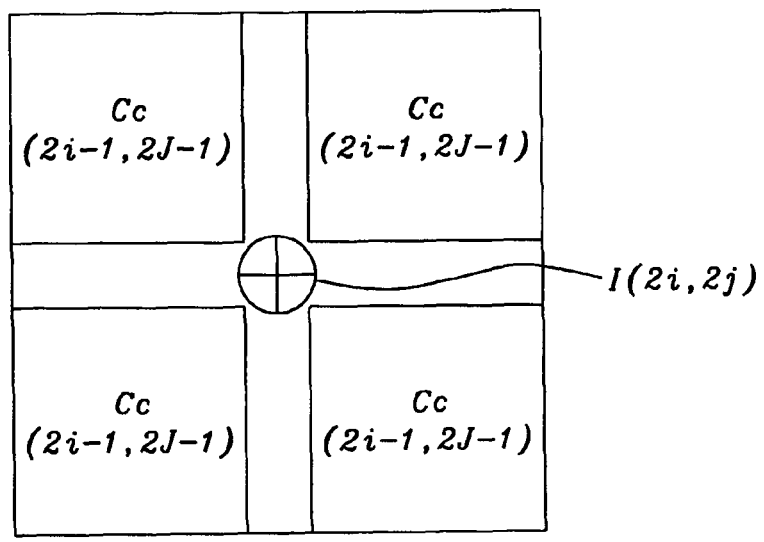

Referring to FIGS. 2a and 2b, the indices i and j are counting variables for indices of the mosaic structured color element array pattern with respect to the color elements Ca, ..., Cd of the array. The even indices (2i,2j) of the mosaic structured color element array pattern define the interstitial spaces adjacent to the color elements Ca, ..., Cd of the array. The odd indices (2i±1,2j±1) of the mosaic structured color element array pattern define the color elements Ca, ..., Cd of the array. The function I(2i,2j) satisfies the shift-invariance, as described above, by the logical statement:

IF $I(2i,2j)=T[a*Ca(2i+1,2j-1)+b*Cb(2i+1,2j+1)+c*Cc(2i-1,2j-1)+d*Cd(2i-1,2j+1)]$

THEN $I(2i-k,2j-l)=T[a*Ca(2i+1-k,2j-1-l)+b*Cb(2i+1-k,2j+1-l)+c*Cc(2i-1-k,2j-1-l)+d*Cd(2i-1-k,2j+1-l)]$

Where:

k and l are incremental counting values that identifies the location of an element within mosaic structured color element array pattern a distance k and l from element i and j of the mosaic structured color element array pattern.

This condition is achieved by a=b=c=d (=0.25 in the case of the average). This is a significant departure from a majority of the prior art in this area for mosaic structured color element array patterns. For standard Bayer pattern the color values (Red, Green, and Blue) are calculated for each location (2i+1,2j+1), (2i+1,2j−1), (2i−1,2j+1), and (2i−1,2j−1). If one calculates a function of the Red, Green, and Blue either by equal Red, Green, and Blue weighting or by the common luminance weighting formula (29.8839% red, 58.6811% green and 11.4350% blue), the shift-invariance condition given above does not hold. Because of this, the interpolation of the method and apparatus of this invention is specified to the function I (intensity) and does not use luminance. The intensity function is also used in the second order derivative calculation. The second order derivative additionally satisfies the shift-invariance condition above. It is important to note that this second order derivative contains the information about the edges in the image. The edges as specified by the second order derivative are used in the interpolation of the method and apparatus of this invention to correct the adjacent color information with respect to the interstitial location (2i,2j). In FIG. 2b the distances between the color elements of the 2×2 mosaic structured color element array to more completely represent the actually distances between the color elements Ca, ..., Cd of the matrix.

Figure 2C:
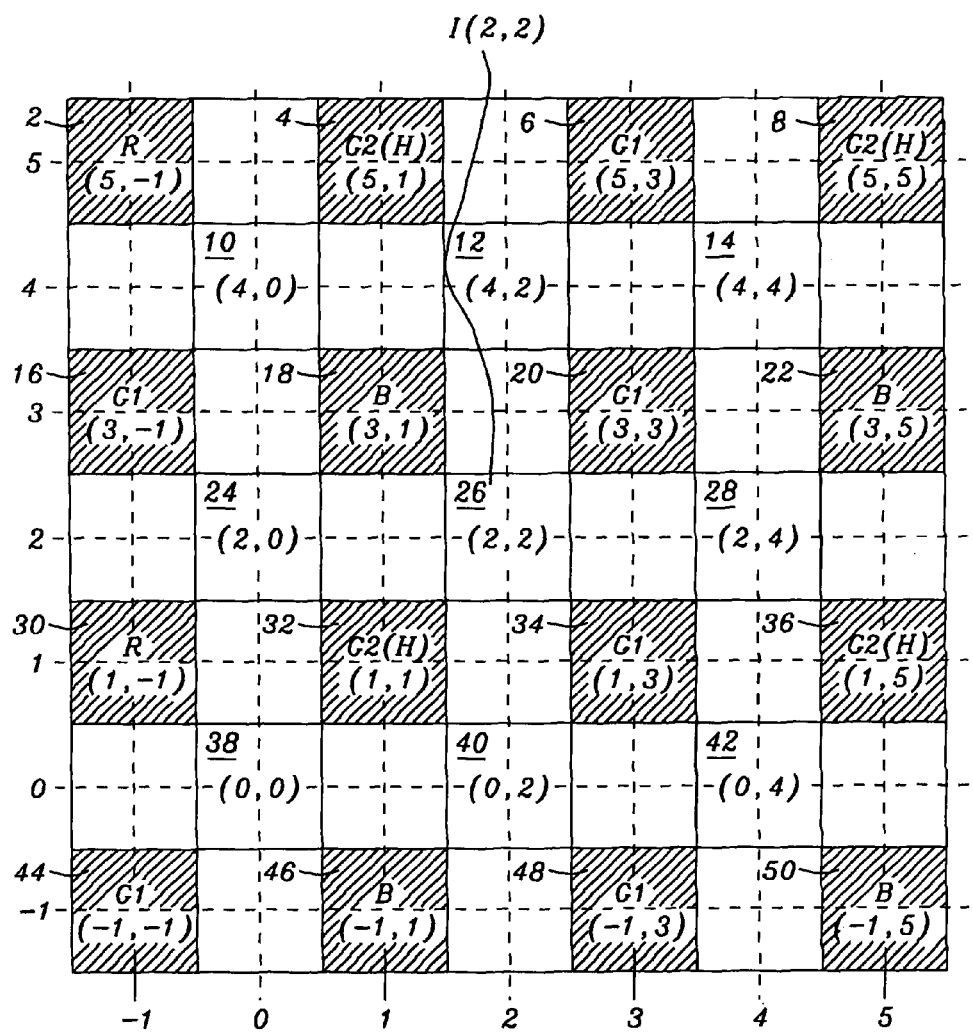

Referring to FIG. 2c, a mosaic structured color element array pattern is divided into a matrix where the color elements are designated with odd index numbers. The interstitial spaces between the color elements are designated with even index numbers. The color elements of the mosaic structured color element array pattern that are designated as Ca, Cb, Cc, and Cc in FIGS. 2a and 2b are respectively translated to Red (R) 34, Green-2 (H) 32, Green-1 (G1) 20, and Blue (B) 18 for the Bayer pattern mosaic structured color element array. The average intensity at the interstitial space (2,2) 26 is the average of the adjacent color elements and is determined according to the formula $$\overline{I(2,2)} = \frac{R(1,3)+H(1,1)+G1(3,3)+B(3,1)}{4}$$

Where:

R(1,3) is the intensity data of the Red color element (R) 34 at location (1,3).

H(1,1) is the intensity data of the second Green color element (H) 32 at location (1,1).

G(3,3) is the intensity data of the first Green color element (G1) 20 at location (3,3).

B(3,1) is the intensity data of the Blue color element (B) 18 at location (3,1).

Figure 3:
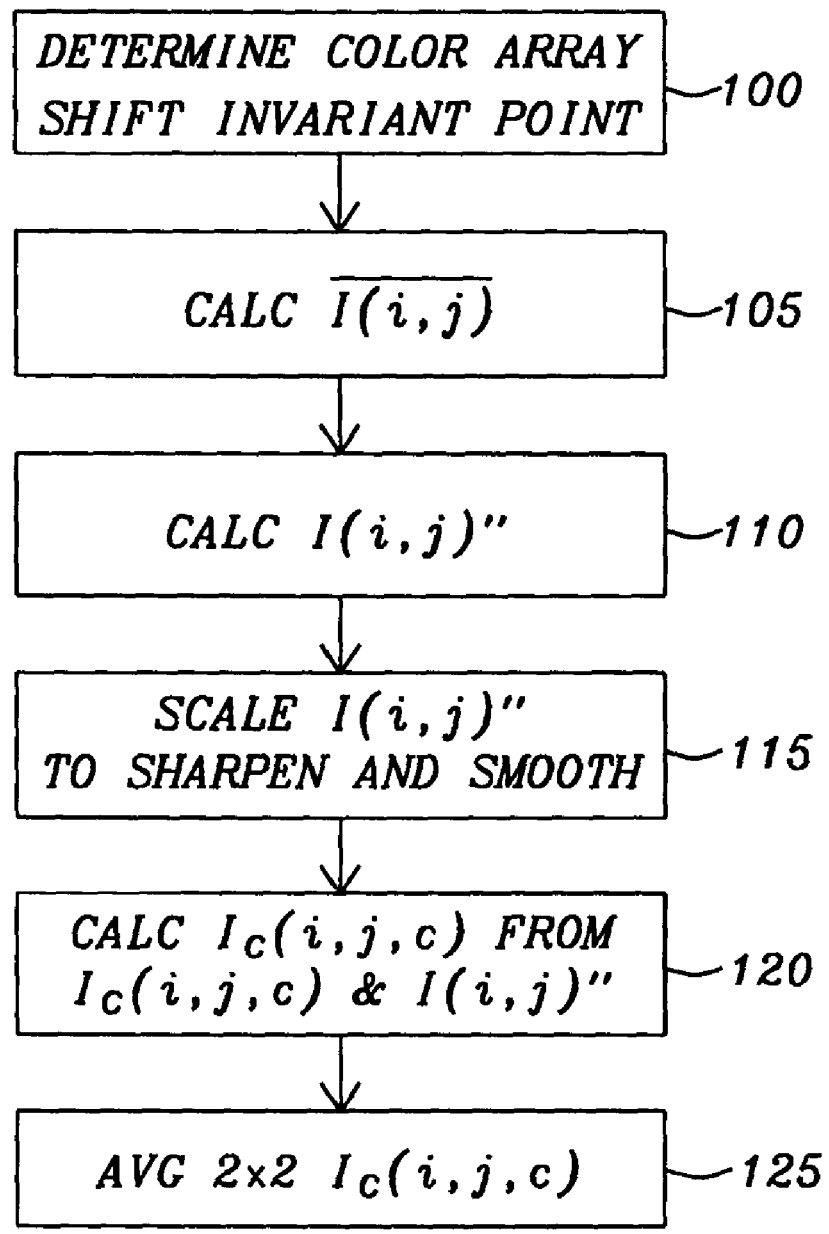
FIG. 3 is a flow chart of the method of this invention for performing shift invariant differential image data interpolation in fully populated shift invariant matrix.

Using the structure of the image array of FIG. 2c, refer now to FIG. 3 for a discussion of the Shift Invariant Differential (SID) Image Data Interpolation method of this invention for processing raw image data with a mosaic structured color element array pattern, such as the Bayer pattern, in a way that allows the calculation of the color values be independent of the location chosen at intervals of maximum sampling spatial frequency. The method begins by determining (Box 100) the locations of the shift invariant points within the mosaic structured color element array pattern. As noted above, the color elements of a mosaic structured color element array pattern are shift variant and the locations within the matrix that are shift invariant for the light intensity and the second order derivative of the intensity must be located. In the structure of FIG. 2c, the shift invariant locations are determined to be in the interstitial space 26 at the junction of the four color elements Red (R) 34, Green-2 (H) 32, Green-1 (G1) 20, and Blue (B) 18 of the Bayer mosaic structured color element array pattern.

The average of the light intensity of the adjacent four color elements 34, 32, 20, and 18 of each interstitial space of each cluster of the array is calculated (Box 105) by the formula:

$$\overline{I(2i, 2j)} = \frac{\sum_{x=0}^{+1} \sum_{y=0}^{+1} I((2*(i-x)-1), (2*(j-y)-1))}{4}$$

Where:

$\overline{I(2i,2j)}$ is the average illumination value at the shift invariant locations within the cluster.

$I((2*(i-x)-1),(2*(j-y)-1))$ is the illumination of an $X^{th}$ and $y^{th}$ color element within the cluster centered on the interstitial space (2i,2j). For the array of FIG. 2c the calculation becomes:

$$\overline{I(2,2)} = \frac{I_B(3,1) + I_{G1}(3,3) + I_H(1,1) + I_R(1,3)}{4}$$

Where:

$\overline{I(2,2)}$ is the intensity value at the interstitial space (2,2) of the pixels within the cluster.

$I_B(3,1)$ is the illumination of the blue pixel (B) within the cluster surrounding the interstitial space (2,2).

$I_{G1}(3,3)$ is the illumination of the first green pixel (G1) within the cluster surrounding the interstitial space (2,2).

$I_R(1,3)$ is the illumination of the red pixel (R) within the cluster surrounding the interstitial space (2,2).

The intensity for each of the interstitial space for each cluster of the pixels for the array is calculated. However, it is required that there are extra rows and columns (−1,−1) that provide the additional data at the edge of the image so that the intensity calculation is for a complete cluster.

Figure 4A:
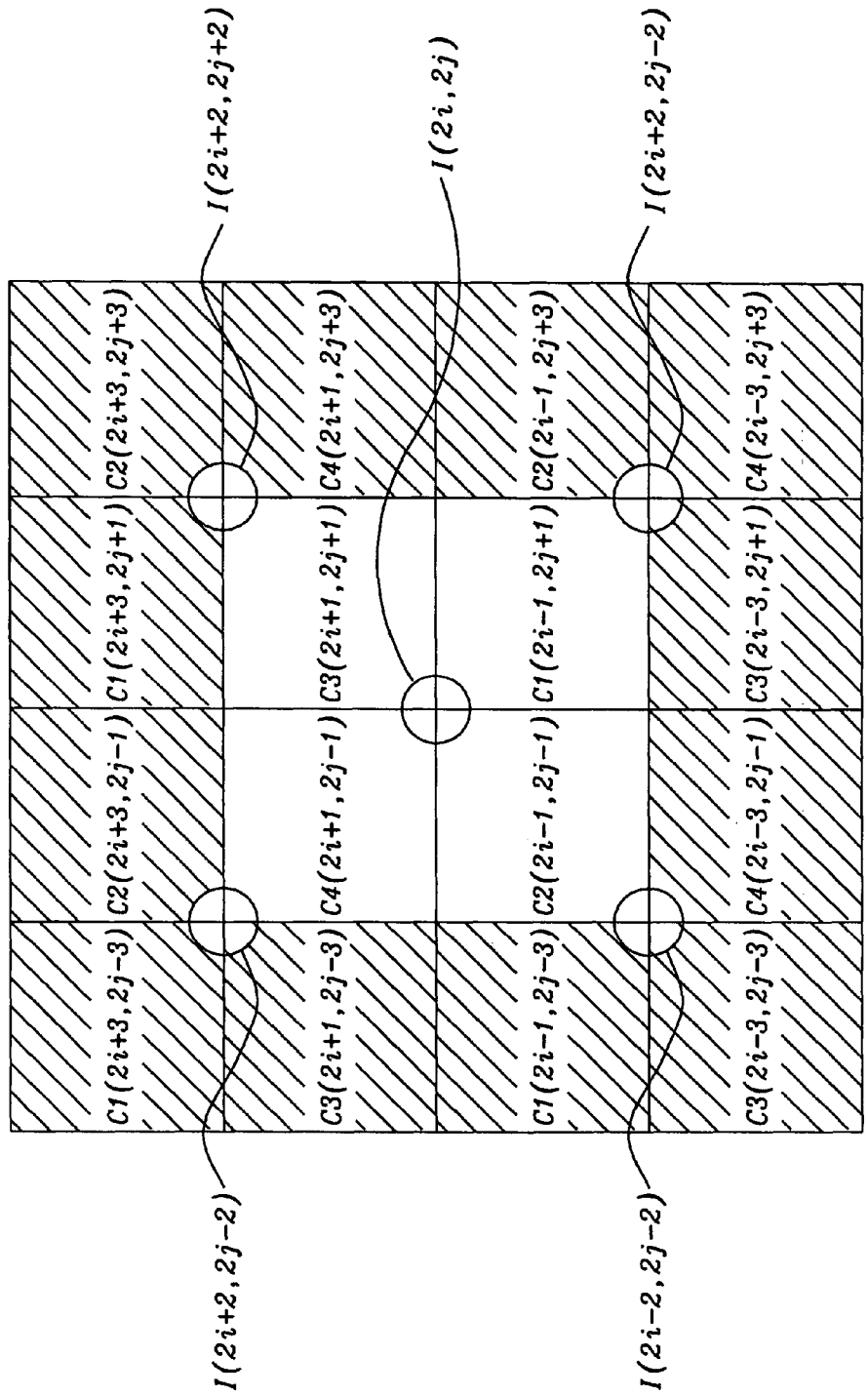
FIGS. 4a and 4b are diagrams for the color filter mosaic array illustration the indexing for the calculation of the second order derivative of the apparatus and method of this invention.

The second order differential between the average intensity for each interstitial space of each cluster of pixel within the array is calculated (Box 110). Referring to FIG. 4a, it can be shown that the second order derivative can be calculated as the sum of the differences of the intensity at the interstitial space (2i,2j) and the diagonal interstitial spaces (2i−2,2j−2) and (2i+2,2j+2) and diagonal interstitial spaces (2i−2,2j+2) and (2i+2,2j−2) or:

$$I_1(2i, 2j)'' = I(2i-2, j-2) - I(2i, 2j) + I(2i+2, 2j+2) - I(2i, 2j)$$
$$= (I(2i-2, 2j-2) + I(2i+2, 2j+2)) - 2*I(2i, 2j)$$

and $$I_2(2i, 2j)'' = I(2i+2, 2j-2) - I(2i, 2j) + I(2i-2, 2j+2) - I(2i, 2j)$$
$$= (I(2i+2, 2j-2) + I(2i-2, 2j+2)) - 2*I(2i, 2j)$$

The average of the two diagonal second order derivatives is further written as:

$$\overline{I(2i, 2j)''} = \frac{I_1(2i, 2j)'' + I_2(2i, 2j)''}{2}$$
$$= \frac{(I(2i-2, 2j-2) + I(2i+2, 2j+2) + I(2i+2, 2j-2j-2) + I(2i-2, 2j+2))}{2} - 2*I(2i, 2j)$$

By substituting in the intensity values (I(2i+x,2j+y)) for each of the pixels and simplifying the average of the two diagonal second order derivative is further written in simplified form as:

$$\overline{I(2i, 2j)''} = \frac{A+B+C}{8} - (I_{C4}(2i+1, 2j-1) + I_{C3}(2i+1, 2j+1) + I_{C2}(2i-1, 2j-1) + I_{C1}(2i-1, 2j+1)) * \frac{3}{8}$$

Where:

$A = I_{C1}(2i+3, 2j-3) + I_{C2}(2i+3, 2j+3) + I_{C3}(2i-3, 2j-3) + I_{C4}(2i-3, 2j+3)$ $B = I_{C2}(2i+3, 2j-1) + I_{C1}(2i+3, 2j+1) + I_{C3}(2i+1, 2j-3) + I_{C1}(2i-1, 2j-3)$ $C = I_{C4}(2i+1, 2j+3) + I_{C2}(2i-1, 2j+3) + I_{C4}(2i-3, 2j-1) + I_{C3}(2i-3, 2j+1)$ $I_{C1}$ is the intensity of the first color of a four color element mosaic array cluster.

$I_{C2}$ is the intensity of the second color of a four color element mosaic array cluster.

$I_{C3}$ is the intensity of the third color of a four color element mosaic array cluster.

$I_{C4}$ is the intensity of the fourth color of a four color element mosaic array cluster.

The above calculation is the diagonal second order derivative and is valid since the interpolation is calculated along the diagonal. If the 4×4 array is approximated as a circle, the second derivative can also be written as $$I(i, j)'' = 2 * [(\text{Average Peripheral Pixels}) - (\text{Average Center Cluster Pixels})].$$

or $$I(i, j)'' = \frac{A+B+C}{6} - \frac{(I_{C4}(2i+1, 2j-1) + I_{C3}(2i+1, 2j+1) + I_{C2}(2i-1, 2j-1) + I_{C1}(2i-1, 2j+1))}{2}$$

There is a scaling coefficient if 8/6 between these two equations. This is a non-critical scaling factor that is compensated for by another scaling coefficient introduced hereinafter for smoothing/sharpening in order to obtain the desired effect.

Figure 4B:
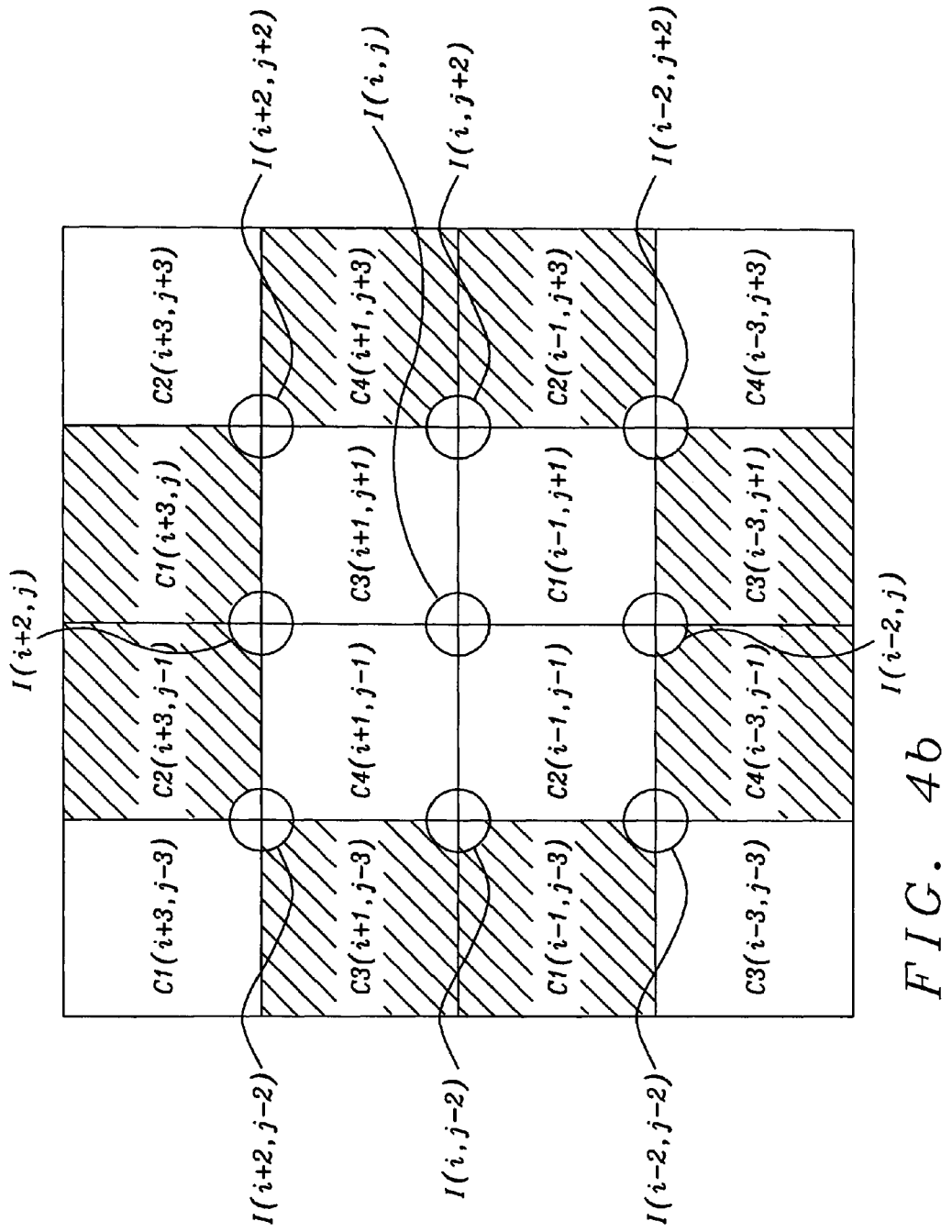

A second embodiment of the calculation (Box 110) of the second order derivative is shown in FIG. 4b. The mosaic structured color element array pattern is a regular array pattern and the axis of interest for the interpolation is along the x-y axis. Instead of using the diagonal, if we average the second order derivative values obtained in the x and y directions for the cluster of pixels, the second order derivatives for the x-direction are:

$$I(2i-2,2j)''=(I(2i-2,2j-2)+I(2i-2,2j+2))-2*I(2i-2,2j)$$

$$I(2i,2j)''=(I(2i,2j-2)+I(2i,2j+2))-2*I(2i,2j)$$

$$I(2i+2,2j)''=(I(2i+2,2j-2)+I(2i+2,2j+2))-2*I(2i+2,2j)$$

Similarly, the second order derivatives for the y-direction are:

$$I(2i,2j-2)''=(I(2i-2,2j-2)+I(2i+2,2j-2))-2*I(2i,2j-2))$$

$$I(2i,2j)''=(I(2i-2,2j)+I(2i+2,2j))-2*I(2i,2j)$$

$$I(2i,2j+2)''=(I(2i-2,2j+2)+I(2i+2,2j+2))-2*I(2i,2j+2)$$

The average of the x-direction and the y-direction equations is:

$$\overline{I(i,j)}'' = \frac{\begin{array}{c}(I(2i-2,2j)'' + I(2i,2j)'' + I(2i+2,2j)'' + \\ I(2i,2j-2)'' + I(2i,2j)'' + I(2i,2j+2)'')\end{array}}{6}$$

$$\overline{I(i,j)}'' = \frac{(2*(D) + E - 2*I(2i,2j))}{6}$$

Where:

$$D=I(2i+2,2j+2)+I(2i+2,2j-2)+I(2i-2,2j+2)+I(2i,2j-2)$$

$$E=I(2i,2j-1)+I(2i+1,2j)+I(2i,2j+1)+I(2i-1,2j)$$

By substituting in the intensity values (I(2i+x,2j+y)) for each of the pixels and simplifying the average of the six x-directional and y-directional second order derivatives, the second order derivative is further written in simplified form as:

$$I(i,j)'' = \frac{(2*A)+B+C}{6} - \frac{\begin{array}{c}4*(I_{C4}(2i+1,2j-1)+I_{C3}(2i+1,2j+1)+ \\ I_{C2}(2i-1,2j-1)+I_{C1}(2i-1,2j+1))\end{array}}{6}$$

In the interpolation method and apparatus of this invention, it is important to note that the calculations are based on the second derivative of intensity obtained from a 4×4 mosaic structured color element pattern within an array. This establishes the 3×3 intensity matrix to allow second order derivative calculations that are shift invariant. This method may be extended to mosaic structured color element array patterns of more than 4×4. This will require more data retention for a real-time hardware implementation. Depending on the mosaic structured color element array pattern, this will require higher order derivatives and not just the second order derivative. However, one skilled in the art would understand that the method with high order derivatives is the same for calculating the derivative in the x and y directions. For the array of FIG. 2c the calculation becomes:

$$I(2,2)'' = \frac{\begin{array}{c}(-2*(I(4,4)+I(4,0)+I(0,4)+I(0,0))) + \\ (I(2,0)+I(4,2)+I(2,4)+I(0,2))\end{array}}{8} - \frac{4*I(2,2)}{8}$$

Where:
I(2,2)" is the second order derivative of the intensity for the interstitial space (2,2).

A smoothing or sharpening of the image is optionally accomplished by scaling (Box 115) the second order derivative by the formula:

$$I_{ss}'' = \frac{I(2i,2j)''}{\text{Scale\_Sharp\_Smooth}}$$

Where:
$I_{ss}''$ is the smoothed and sharpened second order derivative,
I(2i,2j)" is the second order derivative, and
Scale_Sharp_Smooth is the scaling factor. For the array of FIG. 2c the calculation becomes:

$$I_{ss}(2,2)'' = \frac{I(2,2)''}{\text{Scale\_Sharp\_Smooth}}$$

Where:
$I_{ss}(2,2)''$ is the smoothed and sharpened second order derivative,
I(2,2)" is the second order derivative, and
Scale_Sharp_Smooth is the scaling factor.

Any of the interstitial spaces (2i,2j) 10, 12, 14, 24, 26, 28, 38, 40, and 42, (FIG. 2c) of the image array always has the same number of red/green/blue pixels regardless of where in the array the derivative is calculated. This is the fundamental feature of the interpolation algorithm that makes it shift invariant.

The intensity of each color for each interstitial spaces (2i, 2j) 10, 12, 14, 24, 26, 28, 38, 40, and 42 is calculated (Box 120) as function of the raw intensity data $$I_C(2i\pm1,2j\pm1)$$

18, 20, 32, and 34 for each color c of each color element of the cluster and the second order derivative I(2i,2j)". The intensity for each color for each interstitial space is calculated according to the formula:

$$I_{CX}(2i,2j)=I_{cx}(2i-l,2j-m)+I(2i,2j)/2-I(2i-2*l,2j-2*m)/2-I(2i,2j)*/8$$

Where:
x is the designation of the color element type.
l and m are +/−1 depending on color element type.
For the array of FIG. 2c the calculation becomes:

$$I(2,2,H)=I_H(1,1)+I(2,2)/2-I(0,0)/2-I(2,2)*/8$$

$$I(2,2,R)=I_R(1,3)+I(2,2)/2-I(0,4)/2-I(2,2)*/8$$

$$I(2,2,B)=I_B(3,1)+I(2,2)/2-I(4,0)/2-I(2,2)*/8$$

$$I(2,2,G)=I_G(3,3)+I(2,2)/2-I(4,4)/2-I(2,2)*/8$$

For a Bayer mosaic structured color element array pattern, a second process for calculating the intensity of each color for each interstitial spaces (2i,2j) 10, 12, 14, 24, 26, 28, 38, 40, and 42 is described hereinafter. It should be noted that each interstitial spaces (2i,2j) 10, 12, 14, 24, 26, 28, 38, 40, and 42 has two diagonal green color elements (G and H) in the Bayer mosaic structured color element array patterns. The Green intensity of the interstitial spaces (2i,2j) 10, 12, 14, 24, 26, 28, 38, 40, and 42 is calculated using the diagonal green color elements $I_G(2i,2j)$ and the second derivative $I(2i,2j)''$ of the interstitial spaces (2i,2j) 10, 12, 14, 24, 26, 28, 38, 40, and 42. The assumption is that the second derivative $I(2i,2j)''$ based on the average intensity function $\overline{I(2i,2j)}$ at the interstitial space is the best estimate of the second derivative $I_G(2i,2j)''$ of the green signal as well. The step size in calculating the second derivative $I_G(2i,2j)''$ of the green pixel is half the step size used in calculating the $I(2i,2j)''$ from the intensity values. This is the reason for scaling $I_G(2i,2j)''$ by four with respect to the second order derivative $I(2i,2j)''$. The equations are given below:

$$I(2,2)'' = I(1,1) + I(3,3) - 2*I(2,2)''$$

$$I_G(2,2)'' = I(2,2)''/4 = (I_H(1,1) + I_G(3,3)) - 2*I_G(2,2)$$

$$I_G(2,2) = \frac{(I_H(1,1) + I_G(3,3))}{2} - 2*I_G(2,2)''$$

For the Red and Blue pixels, it is assumed that the difference in adjacent green values is the same as the difference of adjacent red/blue values. This is the main divergence from the second order derivative based calculation shown above and it is used in the absence of two red values to base the approximation. Note that the green intensity values ($I_G(2i,2j)$) of the interstitial spaces (2i,2j) 10, 12, 14, 24, 26, 28, 38, 40, and 42 are in the same orientation as the red intensity values ($I_R(2i,2j)$). The red intensity values ($I_R(2,2)$) are given by the equations:

$$I_{R/B}(3,1) - I_R(1,3) = \frac{I_G(2,2)}{2} - \frac{I_G(0,4)}{2}$$

Where:
$I_R/B(3,1)$ is the estimated red intensity value of the Blue color element (3,1).
$I_R/B(3,1)$ is the red intensity value of the Red color element (3,1).
$I_G(2,2)$ is the calculated Green intensity at the interstitial space (2,2).
$I_G(0,4)$ is the calculated Green intensity at the interstitial space (0,4).
Thus $$I_{R/B}(3,1) = I_R(1,3) + \frac{I_G(2,2)}{2} - \frac{I_G(0,4)}{2}$$

$$I_R(2,2) = \frac{I_R(1,3)}{2} + \frac{I_{R/B}(3,1)}{2} - \frac{I(2,2)''}{8}$$

$$I_R(2,2) = I_R(1,3) + \frac{I_G(2,2)}{2} - \frac{I_G(0,4)}{2} - \frac{I(2,2)''}{8}$$

Where:
($I_R(2,2)$) is the calculated Red intensity at the interstitial space (2,2).
It should be noted that one-half of the term for the Red color element intensity $I_R(1,3)$ is from the equation estimating the approximated red intensity value $I_R/B(3,1)$ of the Blue color element (3,1).

Similarly, the Green intensity $I_G(2,2)$ at the interstitial space (2,2) is the calculated in a manner identical to that of the Red intensity $I_R(2,2)$ at the interstitial space (2,2) according to the formula:

$$I_{B/R}(1,3) - I_B(3,1) = \frac{I_G(2,2)}{2} - \frac{I_G(4,0)}{2}$$

Where:
$I_{B/R}(1,3)$ is the estimated blue intensity value of the Red color element (1,3).
$I_B(3,1)$ is the blue intensity value of the Blue color element (3,1).
$I_G(2,2)$ is the calculated Green intensity at the interstitial space (2,2).
$I_G(4,0)$ is the calculated Green intensity at the interstitial space (4,0).
Thus:

$$I_{B/R}(1,3) = I_B(3,1) + \frac{I_G(2,2)}{2} - \frac{I_G(4,0)}{2}$$

$$I_R(2,2) = \frac{I_B(3,1)}{2} + \frac{I_{B/R}(1,3)}{2} - \frac{I(2,2)''}{8}$$

$$I_R(2,2) = I_B(3,1) + \frac{I_G(2,2)}{2} - \frac{I_G(4,0)}{2} - \frac{I(2,2)''}{8}$$

where
$I_B(2,2)$ is the calculated Blue intensity at the interstitial space (2,2).
Alternatively the difference between the intensity values of the interstitial spaces (2i,2j) maybe used to determine the individual color intensities $I_{CX}(2i,2j)$. The use of intensity values of the interstitial spaces (2i,2j) is more efficient for electronic calculation by requiring less memory. The three color intensity values $I_G(2,2)$, $I_R(2,2)$, $I_B(2,2)$ may be electronically calculated in parallel.

$$I_G(2,2) = \frac{I_G(1,1)}{2} + \frac{I_G(3,3)}{2} - \frac{I(2,2)''}{8}$$

$$I_R(2,2) = I_R(1,3) + \frac{I(2,2)}{2} + \frac{I(0,4)}{2} - \frac{I(2,2)''}{8}$$

$$I_B(2,2) = I_B(3,1) + \frac{I(2,2)}{2} + \frac{I(4,0)}{2} - \frac{I(2,2)''}{8}$$

The step size taken during the calculation to interpolate the color data results in the color data information at an increased resolution due to the second order derivative obtained in the center and applied to the adjacent pixel. This manifests itself as a sharpening of the image. To restore the image to its normal resolution and correct systematic color errors, the intensity value for each color element is calculated (Box 125) as the average of each of the color intensity values $I_G(2i,2j)$, $I_R(2i,2j)$, $I_B(2i,2j)$ at the four corners of each color element. The calculated color data points for each interstitial space may be averaged (Box 125) by the formula:

$$\overline{I_c(2i-1, 2j-1)} = \left| \frac{\sum_{x=0}^{1}\sum_{y=0}^{1} I_c((2*(i-x)-2), (2*(j-y)-2))}{4} \right|$$

$$C = Ca, Cb, Cc, Cd$$

where:

$\overline{I_c(2i-1, 2j-1)}$ is the average color data, and $I_C((2*(i-x)-2), (2*(j-y)-2))$ is the calculated color data for each junction of one color element (C), x and y are counting variables for the respectively dimensions i, and j of the plurality of color elements.

It should be noted that the sharpened version of the calculated color data (Box 120) of the interpolated image prior to the averaging (Box 125) would be useful in creating a printed version of the image. It is well known that printers especially an inexpensive printer) have diffusion effects of their inks on paper. The interpolated color data provides a sharpened image to provide some compensation to this diffusion effect.

Figure 5:
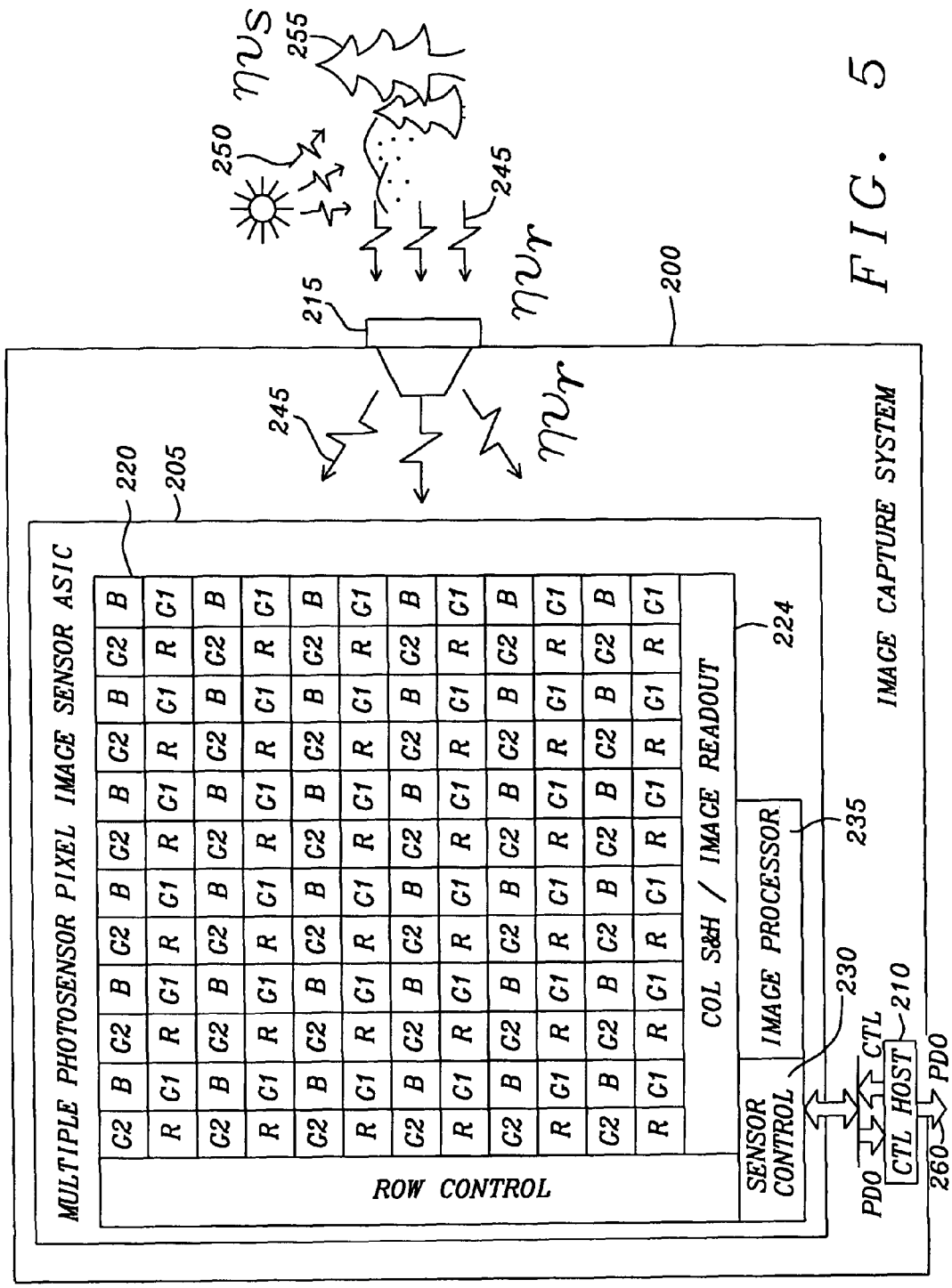
FIG. 5 is a diagram of an imaging system of this invention that incorporates an image processor that performs shift invariant differential image data interpolation in fully populated shift invariant matrix.

Refer now to FIG. 5 for a discussion of a system that incorporates an image processor that performs an interpolation process on raw image data employing a mosaic structure such as the Bayer pattern to prevent uniform illumination interference and color shifting from various edges and shapes within the image. The image capture system 200 includes the image processing application specific integrated circuit 205, control host 210, and a focusing lens 215. As described above the image processing application specific integrated circuit 205 contains a multiple photosensor pixel image sensor array 220 and on-chip image processing 210. The image processing application specific integrated circuit 205 also contains sensor I/O control 230 with an interface with the control host 210. The focusing lens 215 allows passage of reflected light 245 to enter the image capture system 200 and impinge upon the array of multiple photosensor pixel image sensors 220. Ambient lighting 250 is reflected from a scene 255 as the reflected light 245.

The array of multiple photosensor pixel image sensor 220 converts the photons of the reflected light 245 to photoelectrons. The image readout 224 generates digital data signals from the photoelectron. The digital data signals are further manipulated by the image processor 225 and transferred from the control host 210. The control host then the pixel data output 260 for eventual display. The image capture system 200 produces image data 260 that is organized to be equivalent to a video display such as the data structure described above for the Bayer pattern.

Figure 6:
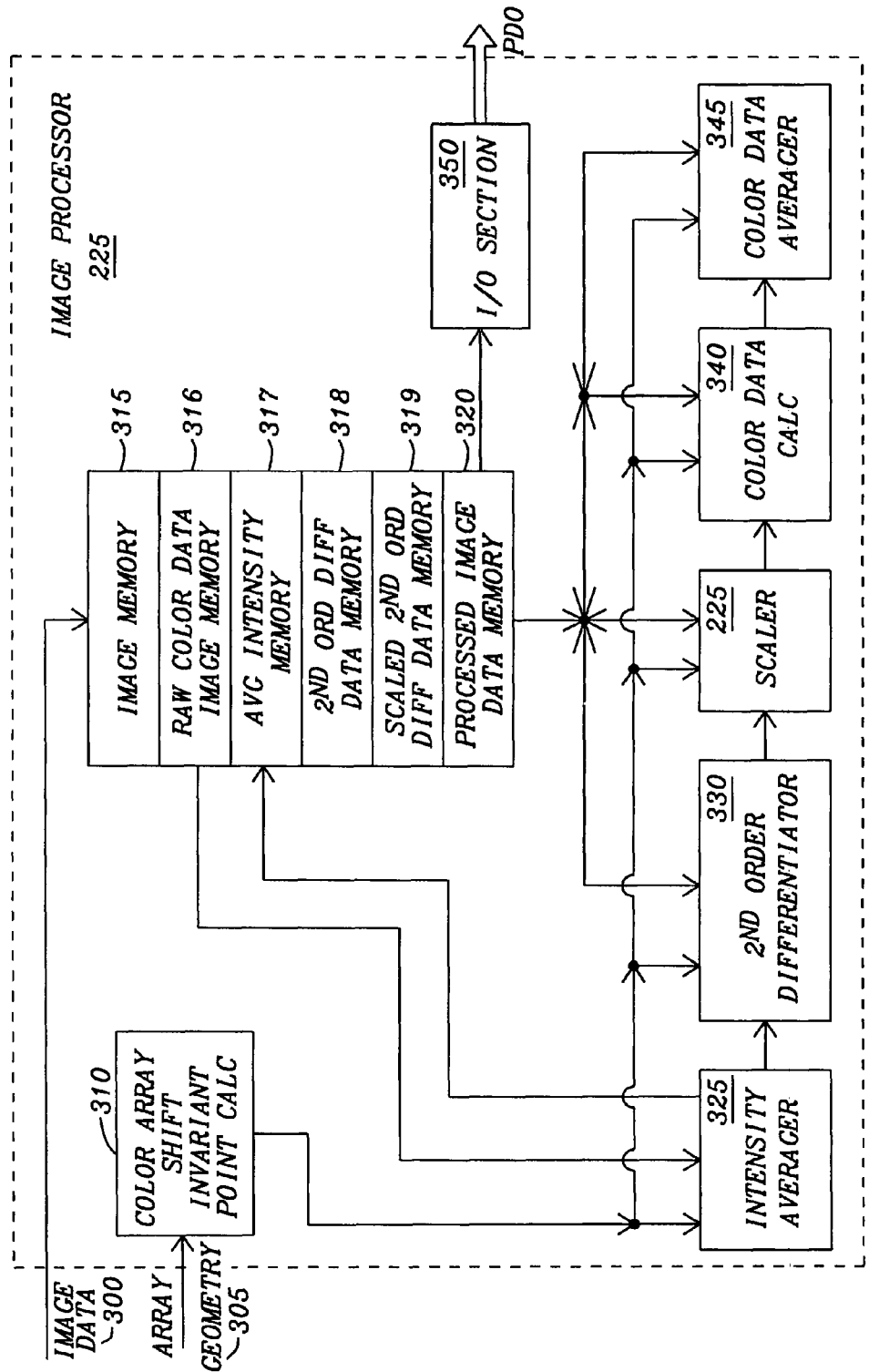
FIG. 6 is a block diagram of a first embodiment of an image processor of this invention that performs shift invariant differential image data interpolation in fully populated shift invariant matrix.

Refer now to FIG. 6 for a discussion of the structure and operation of the image processor 225 of this invention that performs an interpolation process on raw image data of a mosaic structured sensor such as the Bayer pattern of the sensor 220 of FIG. 5 for processing raw image data with a mosaic structured color element array pattern in a way that allows the calculation of the color values to be independent of the location chosen at intervals of maximum sampling spatial frequency. The image processor has a color array shift invariant point calculator 310 which receives an array geometry descriptor 305. From the array geometry descriptor 305, the color array shift invariant point calculator 310 determines the shift invariant points within the mosaic structured color element array pattern according to the procedure (Box 100) of FIG. 3. As noted above, the color elements of a mosaic structured color element array pattern are shift variant and the locations within the matrix that are shift invariant for the light intensity and the second order derivative of the intensity must be located. In the structure of FIG. 2c, the shift invariant locations are determined to be in the interstitial spaces (2i,2j) 26 at the junction of the four color elements (Red (R) 18, Green-2 (H) 20, Green-1 (G1) 32, and Blue (B) 34 of the Bayer mosaic structured color element array pattern.

The raw image data 300 is retained in the Raw Color Data Image Memory 316 of the image memory 315. The intensity averager 325 receives the shift invariant coordinates from the color array shift invariant point calculator 310 and extracts the raw color data from the raw color data image memory 316. The intensity averager 325 determines the average intensity according to the procedure (Box 105) of the method of FIG. 3. The average intensity of each of the shift invariant locations within the mosaic structured color element array pattern is retained in the average intensity memory 317. The second order differentiator 330 receives the average intensity and determines the second order differential between the average intensity for each interstitial space of each cluster of pixel within the array according to the procedure (Box 110) of FIG. 3. As noted above, it can be shown that the second order derivative can be calculated as the sum of the differences of the intensity at the interstitial space (2i,2j) and the diagonal interstitial spaces (2i−2,2j−2) and (2i+2,2j+2) and diagonal interstitial spaces (2i−2,2j+2) and (2i+2,2j−2). The second order differentiated image data is retained within the second order differentiated data memory 318.

The second order differentiated image data is transferred to the scaler circuit 335. The scaler optionally performs a smoothing or sharpening of the second order differentiated image data by the procedure (Box 115) of the method of FIG. 3. The scaled second order differentiated image data is retained by the scaled second order differentiated image data memory 319. Either the second order differentiated image data or the optionally scaled second order differentiated image data is transferred to the color data averager. As described above, the step size taken during the calculation to interpolate the color data results in the color data information at an increased resolution due to the second order derivative obtained in the center and applied to the adjacent pixel. This manifests itself as a sharpening of the image. To restore the image to its normal resolution, the color data averager calculates the intensity value for each color element by the procedure (Box 125) of the method of FIG. 3 as the average of each of the color intensity values $I_G(2i,2j)$, $I_R(2i,2j)$, $I_B(2i,2j)$ at the four corners of each color element. The processed image data is retained by the process image data memory 320 and at the completion of the shift invariant interpolation of the image data, the processed image data is transferred from the image data memory 315 to the input/output section 350 for conditioning and buffering. The processed image data is then transferred as the pixel data output PDO to the control host 210 of FIG. 5.

Figure 7:
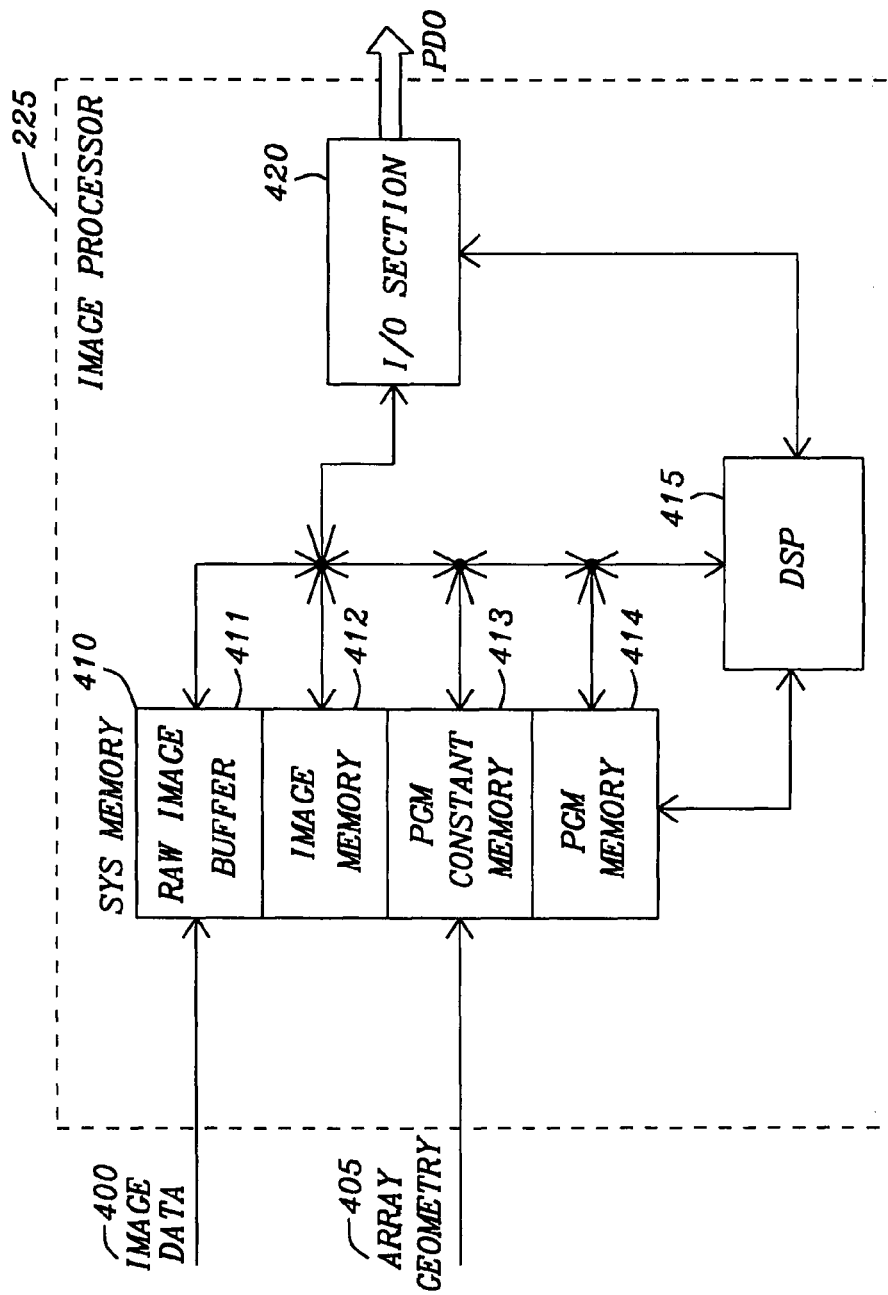
FIG. 7 is a block diagram of a second embodiment of an image processor of this invention that performs shift invariant differential image data interpolation in fully populated shift invariant matrix.

A second embodiment of the image processor 225 of this invention that performs an interpolation process on raw image data of a mosaic structured sensor such as the Bayer pattern of the sensor 220 of FIG. 5 for processing raw image data with a mosaic structured color element array pattern in a way that allows the calculation of the color values to be independent of the location chosen at intervals of maximum sampling spatial frequency is shown in FIG. 7. The image processor includes a system memory 410 that acts as a medium for retaining a computer program code in a program memory 414. The system memory 410 may be any data retention medium such as a Dynamic or Static random access memory, an electro-optical disk, a magnetic disk, a non-volatile random access memory.

The program code is retrieved and executed by a computing system such as the digital signal processor (DSP) 415. The DSP 415 performs a computer program process for processing raw image data for interpolating the raw image data of the mosaic structured sensor. The interpolation of the image data of the mosaic structured color element array pattern allows the calculation of the color values to be independent of the location chosen at intervals of maximum sampling spatial frequency. The program code as retained in the program memory 414 when executed performs the program process that executes the method as described in FIG. 3.

The array geometry descriptor 405 is retained by the program constant memory section 413 of the system memory 410. From the array geometry descriptor 405, the DSP 415 determines the shift invariant points within the mosaic structured color element array pattern according to the procedure (Box 100) of FIG. 3. As noted above, the color elements of a mosaic structured color element array pattern are shift variant and the locations within the matrix that are shift invariant for the light intensity and the second order derivative of the intensity must be located. In the structure of FIG. 2c, the shift invariant locations are determined to be in the interstitial space (2i,2j) and the diagonal interstitial spaces (2i−2,2j−2) and (2i+2,2j+2) and diagonal interstitial spaces (2i−2,2j+2) and (2i+2,2j−2) of the Bayer mosaic structured color element array pattern. The coordinates of the shift invariant points of the mosaic structured color element array pattern are retained in the program constant memory section 413 of the system memory 410

The raw image data 400 is transferred from the mosaic structured sensor 220 of FIG. 5 to the raw image buffer 411 of the system memory 410. The DSP 415 receives the shift invariant coordinates from the program constant memory section 413 and extracts the raw color data from the raw data buffer 411. The DSP 415 determines the average intensity according to the procedure (Box 105) of the method of FIG. 3. The average intensity of each of the shift invariant locations within the mosaic structured color element array pattern is retained in the image data memory 412. The DSP 415 then extracts the average intensity and determines the second order differential between the average intensity for each interstitial space of each cluster of pixel within the array according to the procedure (Box 110) of FIG. 3. As noted above, it can be shown that the second order derivative can be calculated as the sum of the differences of the interstitial space (2i,2j) and the diagonal interstitial spaces (2i−2,2j−2) and (2i+2,2j+2) and diagonal interstitial spaces (2i−2,2j+2) and (2i+2,2j−2). The second order differentiated image data is retained within the image data memory 412.

The second order differentiated image data is extracted from the image data memory 412 by the DSP 415. The DSP 415 optionally performs a smoothing or sharpening of the second order differentiated image data by the procedure (Box 115) of the method of FIG. 3. The scaled second order differentiated image data is then retained by the image data memory 412. Either the second order differentiated image data or the optionally scaled second order differentiated image data is extracted from the image data memory 412. As described above, the step size taken during the calculation to interpolate the color data results in the color data information at an increased resolution due to the second order derivative obtained in the center and applied to the adjacent pixel. This manifests itself as a sharpening of the image. To restore the image to its normal resolution, the DSP 415 calculates the intensity value for each color element by the procedure (Box 125) of the method of FIG. 3 as the average of each of the color intensity values $I_G(2i,2j)$, $I_R(2i,2j)$, $I_B(2i,2j)$ at the four corners of each color element. The processed image data is again retained by the image data memory 412 and at the completion of the shift invariant interpolation of the image data, the processed image data is transferred from the image data memory 412 to the input/output section 420 for conditioning and buffering. The processed image data is then transferred as the pixel data output PDO to the control host 210 of FIG. 5.

The shift invariance is achieved, as described above using the average intensity. As simple as this sounds, it is a significant departure from majority of the work of the prior art in which; an RGB value is calculated for each location (2i,2j). It should be noted that, if one calculates the RGB color values either by equal R/G/B weighting or by the common luminance weighting formula (29.8839% red, 58.6811% green and 11.4350% blue); the shift-invariance condition given above does not hold.

This is one of the main reasons that the intensity function (I) is specified and the luminance function (L) is not used. The intensity function is also used in the second order derivative calculation which still satisfies the shift-invariance condition above. It is important to note that this second order derivative contains the information about the edges in the image. In the final stage of the Shift Invariant Differential Image Data Interpolation method of this invention for processing raw image data with a mosaic structured color element array pattern the second order derivative information that includes edges is used to correct the adjacent color information with respect to the location (2i,2j).

The corrected RGB information of the Shift Invariant Differential Image Data Interpolation method of this invention would be perfect if the color spectrum corresponded to the intensity function of the color elements of the mosaic structured color element array pattern (50% Green, 25% Red, 25% Blue). Since this is not generally true, this error must be corrected. As described above, this is accomplished by the calculating (Box 125) of FIG. 3 intensity value for each color element as the average of each of the color intensity values $I_G(2i,2j)$, $I_R(2i,2j)$, $I_B(2i,2j)$ at the four corners of each color element.

An alternative to the averaging the color intensity values $I_G(2i,2j)$, $I_R(2i,2j)$, $I_B(2i,2j)$ is accomplished by adjusting the location (2i,2j), based on the color information of the adjacent pixels. This alternative method is investigated using the L*a*b color space. The L*a*b color space as described in the Lab Color Space" found Jun. 1, 2006, is also referred to as CIELAB or CIE1976 and is well known in the art and is the most complete color model used conventionally to describe all the colors visible to the human eye. It was developed for this specific purpose by the Commission Internationale d'Eclairage. The three parameters in the model represent the luminance of a color element (L*, L*=0 yields black and L*=100 indicates white), its position between magenta and green (a*, negative values indicate green while positive values indicate red) and its position between yellow and blue (b*, negative values indicate blue and positive values indicate yellow). The CIE 1976 L*a*b color space is based directly on the CIE 1931 XYZ color space and is an attempt to linearize the perceptibility of color differences. The non-linear relations for L*, a*, and b* are intended to mimic the logarithmic response of the eye.

The conversion from RGB color space to L*a*b color space is well known and defined by the standard CIE 1976 (L*a*b*) or CIELAB according to the formulas.

$$\begin{bmatrix} X \\ Y \\ Z \end{bmatrix} = \begin{bmatrix} RGB \to XYZ \\ 3 \times 3 \\ \text{Matrix} \end{bmatrix} \cdot \begin{bmatrix} R \\ G \\ B \end{bmatrix}$$

$$\begin{bmatrix} X \\ Y \\ Z \end{bmatrix} = \begin{bmatrix} 3.24071 & -1.53726 & -0.49857 \\ -0.96926 & 1.87599 & 0.041556 \\ 0.055635 & -0.204 & 1.05707 \end{bmatrix} \cdot \begin{bmatrix} R \\ G \\ B \end{bmatrix}$$

-continued $$L^* = 25*\left[100*\frac{Y}{Y_0}\right]^{\frac{1}{3}} - 16$$

$$a^* = 500*\left[\left(\frac{X}{X_0}\right)^{\frac{1}{3}} - \left(\frac{Y}{Y_0}\right)^{\frac{1}{3}}\right]$$

$$b^* = 200*\left[\left(\frac{Y}{Y_0}\right)^{\frac{1}{3}} - \left(\frac{Z}{Z_0}\right)^{\frac{1}{3}}\right]$$

Where:
RGB is the Red, Green Blue color elements of a mosaic structured color element array pattern such the Bayer pattern.
XYZ is the values of the CIE 1931 XYZ color space.
L* is the luminance of the color elements of the color elements of the mosaic structured color element array pattern.
a* is the green/red values of the color elements of the color elements of the mosaic structured color element array pattern.
b is the blue/yellow values of the color elements of the color elements of the mosaic structured color element array pattern.

In order to apply Shift Invariant Differential Image Data Interpolation method of this invention for processing raw image data with a mosaic structured color element array pattern two different L*a*b* values based on either one of the green pixels must be obtained. The average of two luminance values (L* satisfies the shift-invariance condition for the Shift Invariant Differential Image Data Interpolation method of this invention. The illumination values that are to be the average for the shift invariant differential image data Interpolation maybe the results using any variety of weighting factors in the calculations of luminance of the clusters of the plurality of color elements at the shift invariant points not just the common luminance weighting formula as described above.

Figure 8A:
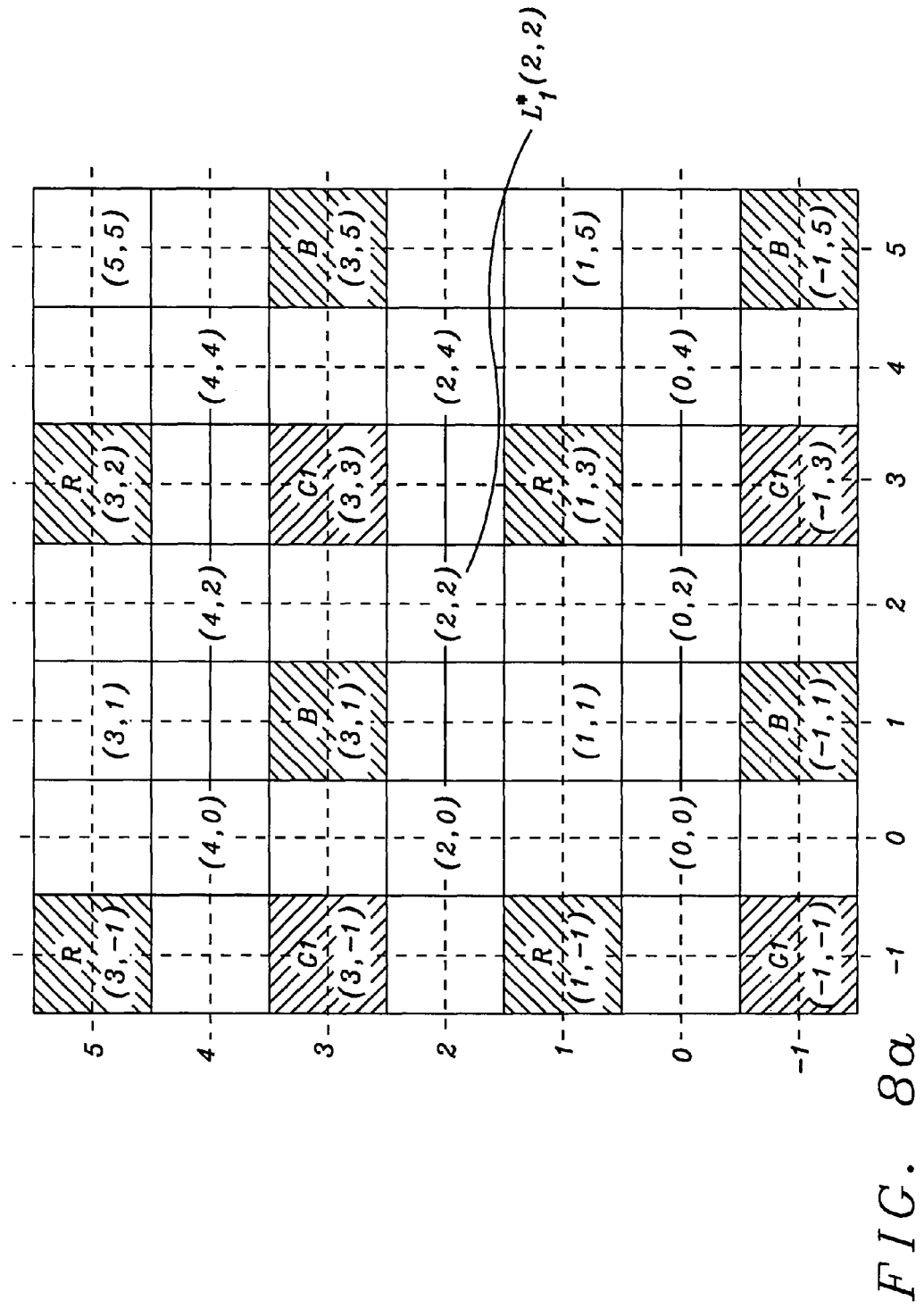
FIGS. 8a and 8b are diagrams of portions of an image constructed of Bayer patterned pixel illustrating averaging of the luminance of clusters of the Bayer pattern mosaic color element array.
Figure 8B:
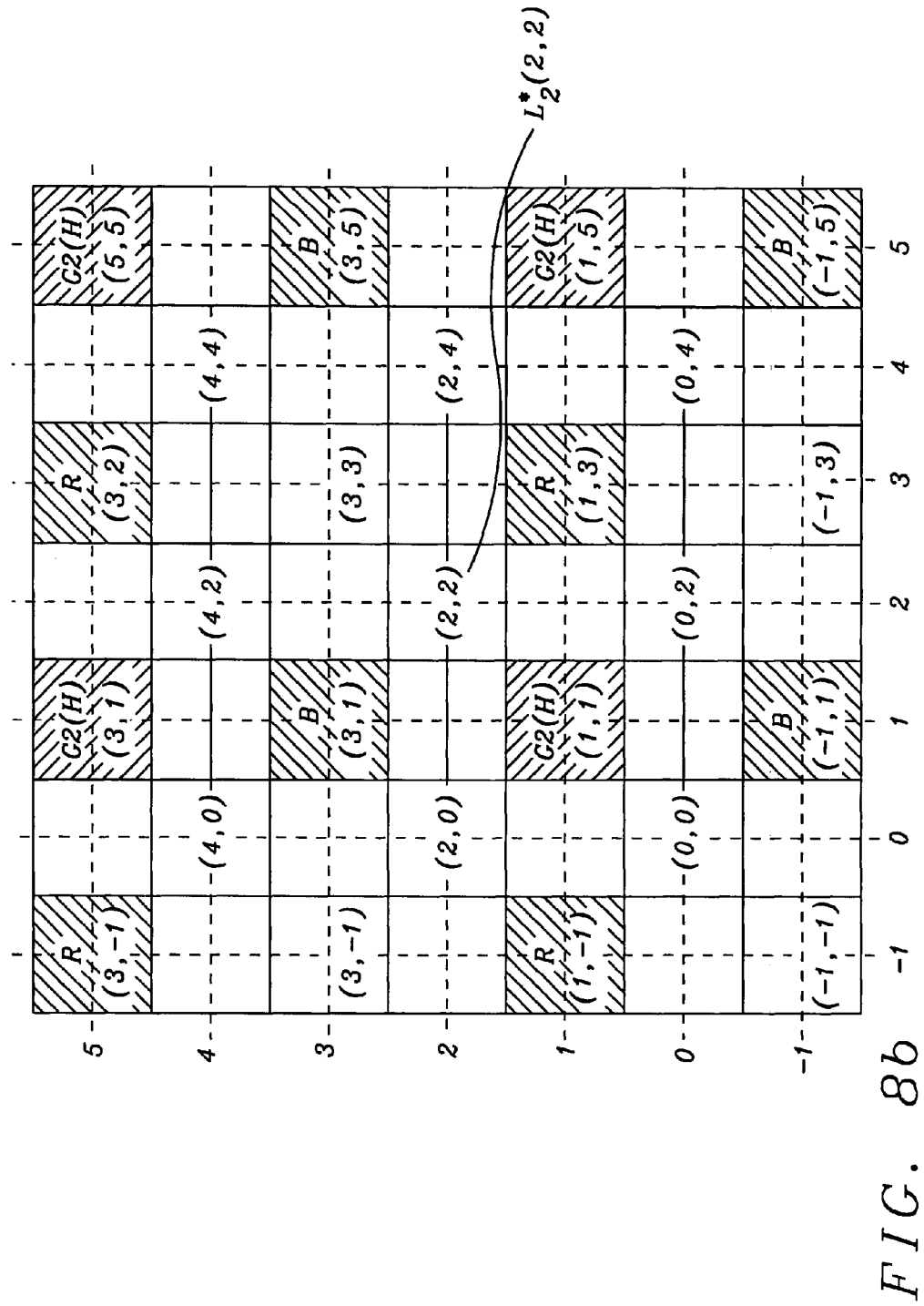

Refer now to FIGS. 9a and 9b for a discussion of the Shift Invariant Differential Image Data Interpolation method of this invention for processing raw image data with a mosaic structured color element array pattern using the two Luminance values. In FIG. 8a, the calculation of the first luminance value $L^*_1(2,2)$ of the interstitial space (2,2) is according to the above formulae where the variable R is the red color element (1,3), the variable G is the first green color element (3,3), and the variable B is the blue color element (3,1). The second green color element (1,1) is not used. In FIG. 8b, the calculation of the second luminance value $L^*_2(2,2)$ of the interstitial space (2,2) is according to the above formulae where the variable R is the red color element (1,3), the variable G is the second green color element (1,1), and the variable B is the blue color element (3,1). The first green color element (3,3) is not used.

The two luminance values $L^*_1(2i,2j)$ and $L^*_2(2i,2j)$ are then averaged to derive the average luminance $\overline{L^*(2i,2j)}$. The average luminance $\overline{L^*(2i,2j)}$ satisfies the shift invariant property determined in procedure (Box 100) of the Shift Invariant Differential Image Data Interpolation method of this invention of FIG. 3. The calculating of the average luminance $\overline{L^*(2i,2j)}$ is equivalent to the calculating (Box 105) of the average intensity of FIG. 3. The second order derivative of the average luminance $\overline{L^*(2i,2j)}$ is then determined according procedure (Box 110) of FIG. 3. The remaining procedures—Scaling (Box 115) and calculating the interstitial space colors (Box 120)—are executed as described above. The averaging (Box 125) of the interstitial space colors for each color element as the average of each of the average luminance values $L^*_1(2i,2j)$ and $L^*_2(2i,2j)$ at the four corners of each color element. When L_a*_b* color space is the end result of the interpolation, the average luminance $\overline{L^*(2i,2j)}$ obtained from first green color element G1 and the second green color element G2 will be shift invariant at the boundary of the first green color element G1 and the second green color element G2. A correction for a* and b* is possible. This information is preserved in the a* and b* values and can be used depending on the number of computer processing cycles allowed for generation of the output picture format.

Refer back now to FIG. 2c for an example of the execution of the method of FIG. 3 and the operation of the image processors of FIGS. 6 and 7. The number of lines or rows of the photosensor pixel image sensor array 220 of FIG. 5 that generates the mosaic structured color element array pattern image data used in a given interpolation algorithm is a very critical parameter for complete camera-on-chip image capture systems 200 of FIG. 5. The amount of memory used (hence a significant silicon area) increases drastically with number of lines or rows of the sensor array 220. Another factor is the number of operations needed to perform the interpolation. The 4×4 mosaic structured color element array pattern matrix of FIG. 2c is employed as an example of the data size for SID implementation on chip.

Table 1 and Table 2 illustrate two examples in which to illustrate how the Shift Invariant Differential Image Data Interpolation method of this invention functions. The first example shows a falling edge (from left to right) and the second example shows a dark band in the image. The values of each of the color elements 2, . . . , 50 are given in the column INTEN VALUE of Table 1.

It should be noted the indexing structure of the mosaic structured color element array pattern of FIG. 2c has the color elements at the odd indices and the interstitial spaces at the even indices. The values in the column INTEN VALUE of Table 1 and Table 2 use the same value for all colors for illustration purposes. In a real application, the color information is never in perfect match along the edges.

The column AVG INT shows the calculated values of the average intensity of the color elements surrounding interstitial spaces. The calculated second order differential values are shown in the column 2ND DIF. An example of the calculated Red intensity values of the interstitial spaces are shown in the column CALC RED. The column CALC AVG illustrates the calculated average intensity of the second green color element (H) 32 and the red color element (R) 34.

TABLE 1

| COLOR ELEMENT | INT SPACE | INTEN VALUE | AVG INT | 2ND DIF | CALC RED | CALC AVG |
|---|---|---|---|---|---|---|
| 2 | 5, −1 | 8 | | | | |
| 4 | 5, 1 | 8 | | | | |
| 6 | 5, 3 | 4 | | | | |
| 8 | 5, 5 | 0 | | | | |
| 10 | | | 4, 0 | 8 | | |
| 12 | | | 4, 2 | 6 | | |
| 14 | | | 4, 4 | 2 | | |
| 16 | 3, −1 | 8 | | | | |
| 18 | 3, 1 | 8 | | | | |
| 20 | 3, 3 | 4 | | | | |
| 22 | 3, 5 | 0 | | | | |

TABLE 1-continued

| COLOR ELEMENT | INT SPACE | INTEN VALUE | AVG INT | 2ND DIF | CALC RED | CALC AVG |
|---|---|---|---|---|---|---|
| 24 | 2, 0 |  | 8 |  | 8.25 |  |
| 26 | 2, 2 |  | 6 | −2 | 6.25 |  |
| 28 | 2, 4 |  | 2 | 2 | 1.75 |  |
| 30 | 1, −1 | 8 |  |  |  |  |
| 32 | 1, 1 | 8 |  |  |  | 7.25 |
| 34 | 1, 3 | 4 |  |  |  | 4 |
| 36 | 1, 5 | 0 |  |  |  |  |
| 38 | 0, 0 |  | 8 |  | 8.25 |  |
| 40 | 0, 2 |  | 6 | −2 | 6.25 |  |
| 42 | 0, 4 |  | 2 | 2 | 1.75 |  |
| 44 | −1, −1 | 8 |  |  |  |  |
| 46 | −1, 1 | 8 |  |  |  |  |
| 48 | −1, 3 | 4 |  |  |  |  |
| 50 | −1, 5 | 0 |  |  |  |  |

TABLE 2

| COLOR ELEMENT | INT SPACE | VALUE | AVG INT | 2ND DIF | CALC RED | CALC AVG |
|---|---|---|---|---|---|---|
| 2 | 5, −1 | 8 |  |  |  |  |
| 4 | 5, 1 | 8 |  |  |  |  |
| 6 | 5, 3 | 4 |  |  |  |  |
| 8 | 5, 5 | 8 |  |  |  |  |
| 10 | 4, 0 |  | 8 | −2 |  |  |
| 12 | 4, 2 |  | 6 | +2 |  |  |
| 14 | 4, 4 |  | 6 | +2 |  |  |
| 16 | 3, −1 | 8 |  |  |  |  |
| 18 | 3, 1 | 8 |  |  |  |  |
| 20 | 3, 3 | 4 |  |  |  |  |
| 22 | 3, 5 | 8 |  |  |  |  |
| 24 | 2, 0 |  | 8 | −2 | 8.25 |  |
| 26 | 2, 2 |  | 6 | +2 | 3.75 |  |
| 28 | 2, 4 |  | 6 | +2 | 3.75 |  |
| 30 | 1, −1 | 8 |  |  |  |  |
| 32 | 1, 1 | 8 |  |  |  | 6 |
| 34 | 1, 3 | 4 |  |  |  | 3.75 |
| 36 | 1, 5 | 8 |  |  |  |  |
| 38 | 0, 0 |  | 8 | −2 | 8.25 |  |
| 40 | 0, 2 |  | 6 | +2 | 3.75 |  |
| 42 | 0, 4 |  | 6 | +2 | 3.75 |  |
| 44 | −1, −1 | 8 |  |  |  |  |
| 46 | −1, 1 | 8 |  |  |  |  |
| 48 | −1, 3 | 4 |  |  |  |  |
| 50 | −1, 5 | 8 |  |  |  |  |

In Table 2 above, the column AVG INT shows the calculated values of the average intensity of the color elements surrounding interstitial spaces. The calculated second order differential values are shown in the column 2ND DIF. An example of the calculated Red intensity values of the interstitial spaces are shown in the column CALC RED. The column CALC AVG illustrates the calculated average intensity of the second green color element (H) 32 and the red color element (R) 34.

TABLE 3

| COLOR ELEMENT | INT SPACE | VALUE | AVG INT | 2ND DIF | CALC RED |
|---|---|---|---|---|---|
| 2 | 5, −1 | 8 |  |  |  |
| 4 | 5, 1 | 8 |  |  |  |
| 6 | 5, 3 | 4 |  |  |  |
| 8 | 5, 5 | 0 |  |  |  |
| 10 | 4, 0 |  | 8 |  |  |
| 12 | 4, 2 |  | 6 |  |  |
| 14 | 4, 4 |  | 2 |  |  |
| 16 | 3, −1 | 8 |  |  |  |
| 18 | 3, 1 | 8 |  |  |  |
| 20 | 3, 3 | 4 |  |  |  |
| 22 | 3, 5 | 0 |  |  |  |
| 24 | 2, 0 |  | 8 |  | 9 |
| 26 | 2, 2 |  | 6 | −2 | 7 |
| 28 | 2, 4 |  | 2 | 2 | 1 |
| 30 | 1, −1 | 8 |  |  |  |
| 32 | 1, 1 | 8 |  |  |  |
| 34 | 1, 3 | 4 |  |  |  |
| 36 | 1, 5 | 0 |  |  |  |
| 38 | 0, 0 |  | 8 |  | 9 |
| 40 | 0, 2 |  | 6 | −2 | 7 |
| 42 | 0, 4 |  | 2 | 2 | 1 |
| 44 | −1, −1 | 8 |  |  |  |
| 46 | −1, 1 | 8 |  |  |  |
| 48 | −1, 3 | 4 |  |  |  |
| 50 | −1, 5 | 0 |  |  |  |

Table 3 illustrates the optional smoothing or sharpening of the image with an edge as in Table 1 as shown in the scaling procedure (Box 115) as described in FIG. 3. The column CALC RED shows the calculated color values of the interstitial spaces (2,0), (2,2), (2,4) with a scaling factor of 4.

TABLE 4

| COLOR ELEMENT | INT SPACE | VALUE | AVG INT | 2ND DIF | CALC RED |
|---|---|---|---|---|---|
| 2 | 5, −1 | 8 |  |  |  |
| 4 | 5, 1 | 8 |  |  |  |
| 6 | 5, 3 | 4 |  |  |  |
| 8 | 5, 5 | 8 |  |  |  |
| 10 | 4, 0 |  | 8 | −2 |  |
| 12 | 4, 2 |  | 6 | +2 |  |
| 14 | 4, 4 |  | 6 | +2 |  |
| 16 | 3, −1 | 8 |  |  |  |
| 18 | 3, 1 | 8 |  |  |  |
| 20 | 3, 3 | 4 |  |  |  |
| 22 | 3, 5 | 8 |  |  |  |
| 24 | 2, 0 |  | 8 | −2 | 9 |
| 26 | 2, 2 |  | 6 | +2 | 3 |
| 28 | 2, 4 |  | 6 | +2 | 3 |
| 30 | 1, −1 | 8 |  |  |  |
| 32 | 1, 1 | 8 |  |  |  |
| 34 | 1, 3 | 4 |  |  |  |
| 36 | 1, 5 | 8 |  |  |  |
| 38 | 0, 0 |  | 8 | −2 | 9 |
| 40 | 0, 2 |  | 6 | +2 | 3 |
| 42 | 0, 4 |  | 6 | +2 | 3 |
| 44 | −1, −1 | 8 |  |  |  |
| 46 | −1, 1 | 8 |  |  |  |
| 48 | −1, 3 | 4 |  |  |  |
| 50 | −1, 5 | 8 |  |  |  |

Table 4 illustrates the optional smoothing or sharpening of the image with an edge as in Table 1 as shown in the scaling procedure (Box 115) as described in FIG. 3. The column CALC RED shows the calculated color values of the interstitial spaces (2,0), (2,2), (2,4) with a scaling factor of 4.

Figure 9:
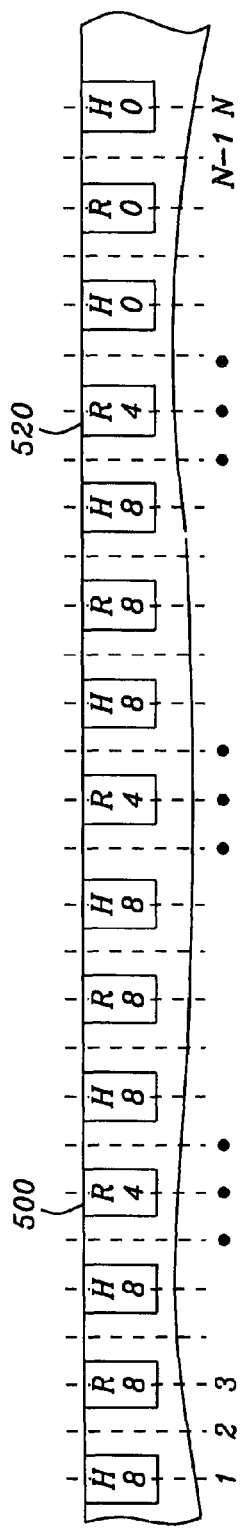
FIG. 9 is a diagram of a single row of a mosaic structured color element array pattern.

The two examples of Tables 1 and 2 as shown in FIG. 9 are in one dimension to illustrate the different interpolation techniques discussed for the Shift Invariant Differential Image Data Interpolation method of this invention. The Shift Invariant Differential Image Data Interpolation method of this invention is further compared with a simple linear interpolation algorithm. The Simple Linear Algorithm utilizes the average of the nearest neighbors of the same color and is presented to capture the typical problems with narrow lines and coloration of the edges.

The structure of the single row of color elements have equivalent indices to those shown in FIG. 2c with each color element having an odd index and the interstitial spaces having an even index. With a single row of color elements in the matrix, the general form can be developed such that the corrected color values developed from the intensity value for each color element as calculated (Box 125) as the average of each of the color intensity values for each of the interstitial spaces surrounding the color element. In this case, the interstitial space is on each side of the color element. With the a single row of color elements, in the general form of the Shift Invariant Differential Image Data Interpolation method of this invention, the corrected intensity value for each color element is calculated (Box 125) of FIG. 3 using the formula:

$$I(2n)=H(2n-1)+R(2n+1)/2$$

$$X_1(2n)1=X_1(2n-1)+I(2n)/2-I(2n-2)/2-I(2n)*/8$$

$$X_2(2n)=X_2(2n+1)+I(2n)/2-I(2n+2)/2-I(2n)*/8$$

Where:
I is the intensity of the interstitial spaces as calculated above.
n is a counting variable from 1 to N/2.
X1 is the green color element G of the row of color elements for n equal to an odd number and the red color element R of the row of color elements n equal to an even number.
X2 is the green color element G of the row of color elements for n equal to an even number and the red color R element of the row of color elements n equal to an odd number.

The Shift Invariant Differential Image Data Interpolation method of this invention is uses the GREEN values in the interpolation of the RED color elements as given by the following equations.

$$R(2n)=R(2n+1)+H(2n)/2-H(2n+2)/2-I(2n)*/8$$

Where:
H is the green color element of the row of color elements.
R is the red color element of the row of color elements.
n is a counting variable from 1 to N/2.
I is the intensity of the interstitial spaces as calculated above.

The intensity values are used in the Green (H) interpolation because this is only a one dimensional data set. In the two dimensional the Shift Invariant Differential Image Data Interpolation method of this invention, as described above for FIG. 2c, the Green (H) pixels from the other rows are used together with the second derivative function which gives better results than what is presented here in one dimension. It should be noted that values G(2n) and G(2n+2) are calculated green values as indicated by even numbers.

Figure 10:
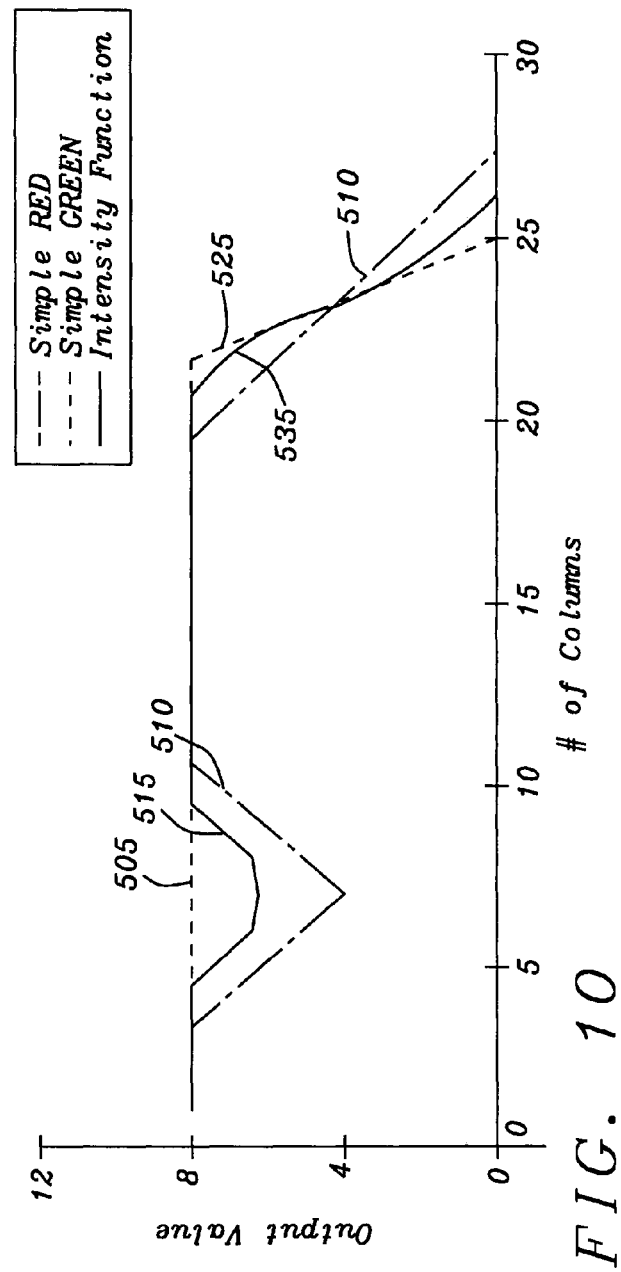
FIG. 10 is a plot of the illumination values of Table 1 and Table 3 for the single row of a mosaic structured color element array pattern.

The results of these three models are shown in FIG. 10. Several problems can be observed with the simple linear algorithm. Small line features can cause coloration as seen by the dip 500 of the Red data. In this case, the simple green data 505 completely misses the dip 500 since the dip 500 does not coincide with any sampled green data. The plot of the dip 500 is included in the simple plotting 510 of the red data. Similarly, the edge 520 on the right hand side shows systematic coloration of the edges where the bright region 525 will have a green edge and the dark region 530 will have a red edge. This can be easily seen when the green and red values 505 and 510 are compared with the intensity function 515, as calculated above.

Figure 11:
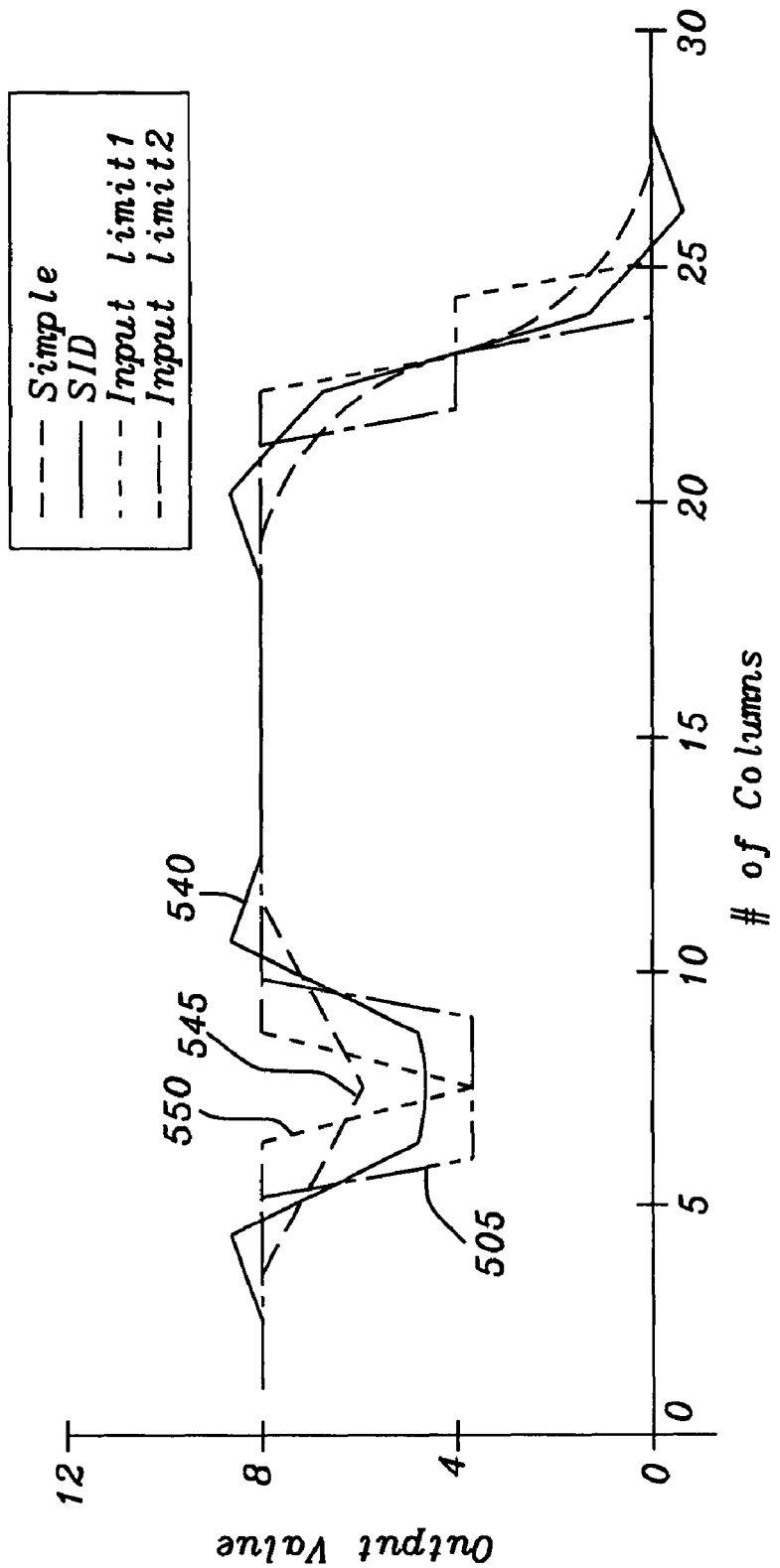
FIG. 11 is a plot of invariant differential image data interpolation of the image data of Table 1 and Table 3 compared with the simple interpolation values of the image data.

The plots of FIGS. 10-11 do not illustrate the overall image contrast. The comparison between the Shift Invariant Differential Image Data Interpolation method of this invention and simple linear interpolation is shown in FIG. 11. The smooth shape given by the plot 545 of the simple interpolation algorithm causes the overall picture to appear "soft" and out of focus. This is typically observed with printed material where the soft image is hard to read. In contrast, Shift Invariant Differential Image Data Interpolation method of this invention 540 will always have sharper edges since the intensity function is adjusted based on the second order derivative. Based on the given data, upper limits 550 and lower limits 555 is also shown where the location of the edge can not be determined in the region between these curves. The key point of the Shift Invariant Differential Image Data Interpolation method of this invention is to present the best estimate of the edge without coloration artifacts. Thus, the general Shift Invariant Differential Image Data Interpolation method 540 of this invention algorithm performs significantly better than the simple linear interpolation algorithm 545. The small dip on the left is captured in both red and green outputs. However, some coloration at the edge on the right hand side is still present.

Figure 12:
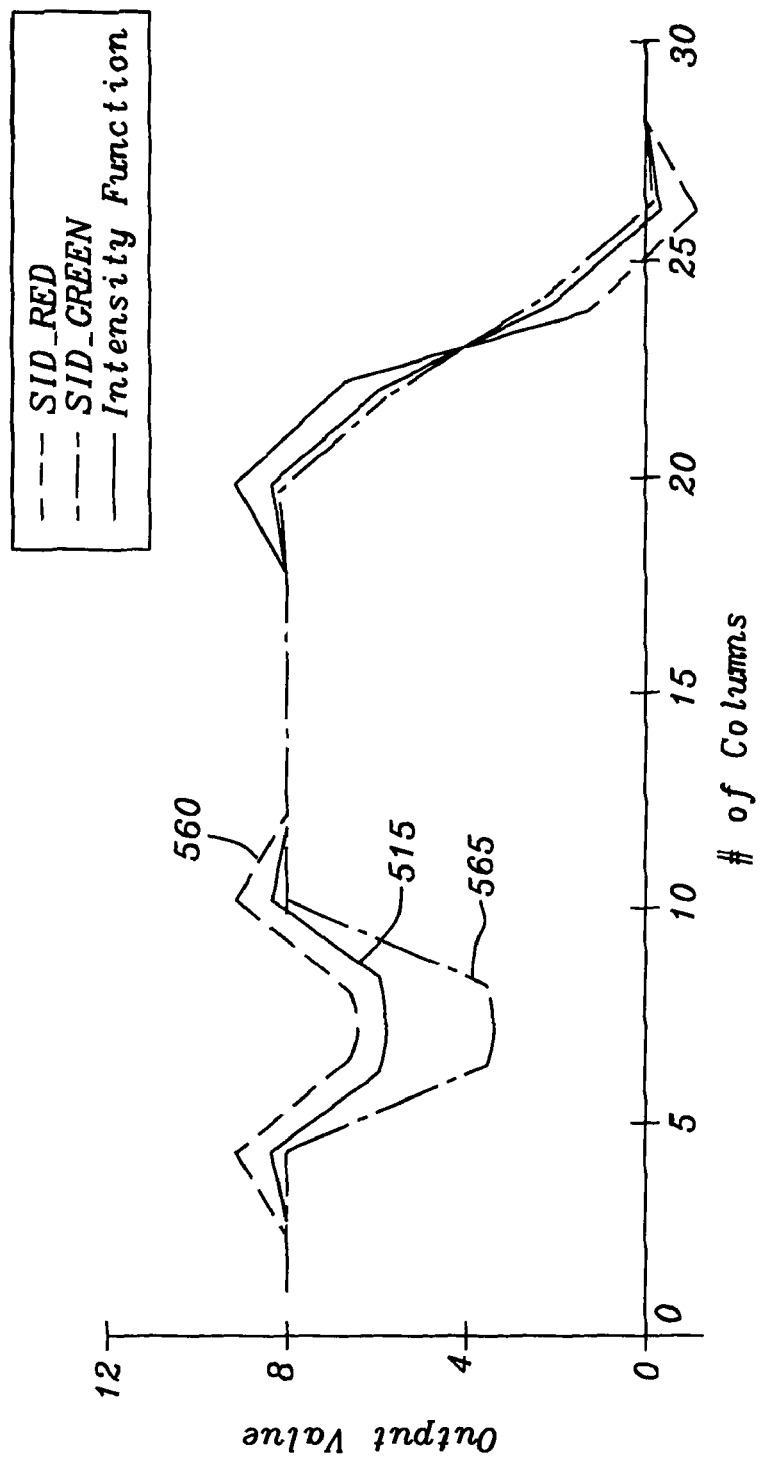
FIGS. 12-13 is a plot of shift invariant differential image data interpolation of the image data of Table 1 and Table 3 showing the basic intensity function and the shift invariant differential red image data interpolation using green interpolated data and shift invariant differential red image data interpolation using basic intensity data.
Figure 13:
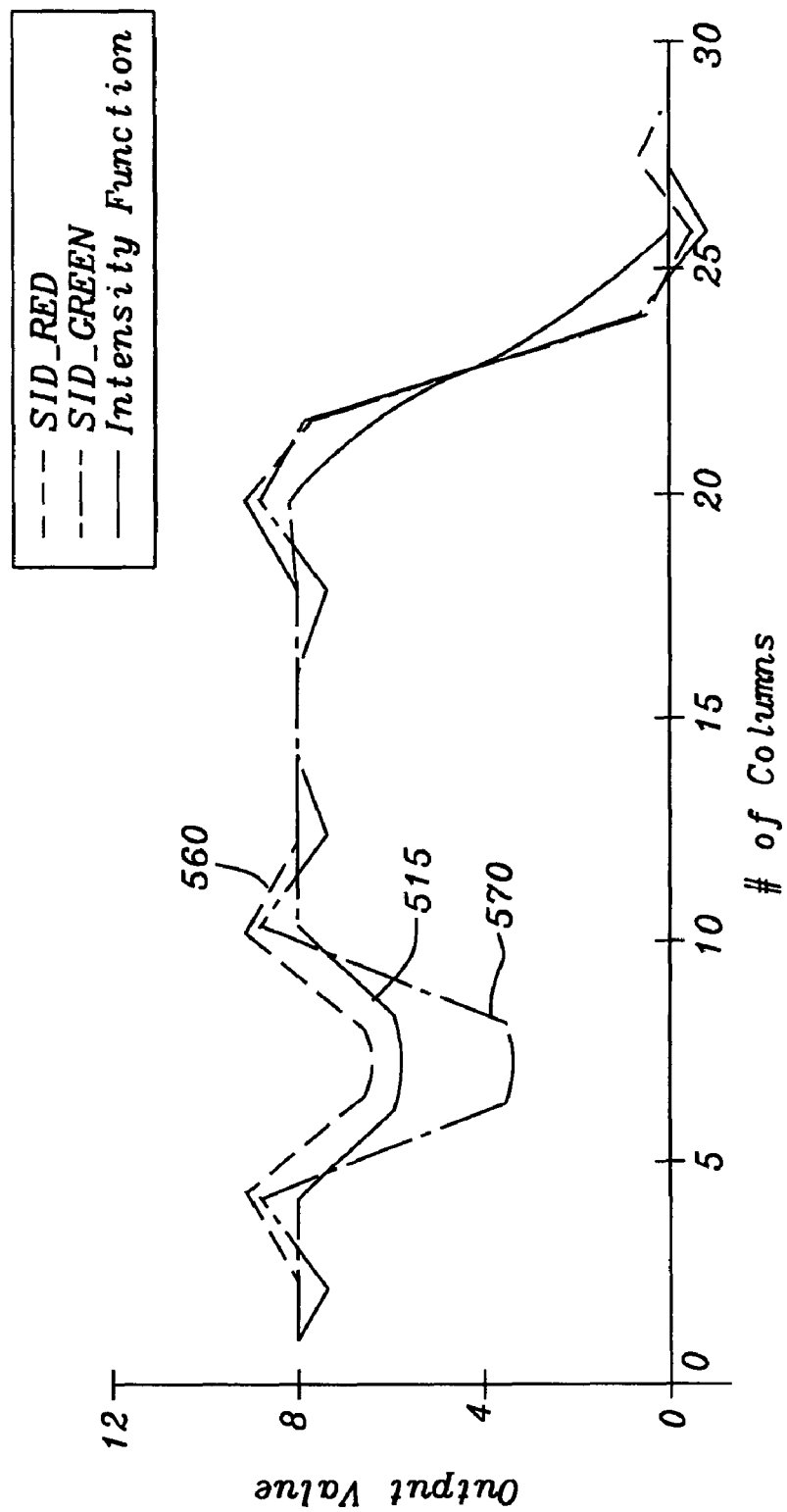

In FIG. 12, the calculation of the interpolated Red values uses the calculated intensity values in the plot 565 and is pair with the plot of the calculation of the green values in the plot 560 as calculated above. In contrast, in FIG. 13, the Red calculated values now use the green calculated values in the plot 570 and are compared to the green calculated values of the plot 560. The coloration at the edge almost completely disappears when Red calculated values using the Green calculation values in the Shift Invariant Differential Image Data Interpolation method of this invention is used. This was confirmed with actual images. It should be noted that the Note that Red calculated values using the Green calculation values, as in plot 570 is not exclusive for the Bayer pattern color filter mosaic array and can be used even if each color element of a 2×2 color element group different colors. It simply states that one of the colors should be chosen as the primary color and interpolated first. The other colors would then use this interpolated color value in the equations substituting the general formula using the intensity function.

In summary, the Shift Invariant Differential Image Data Interpolation method and the image processor that provides the mechanisms necessary for performing the Shift Invariant Differential Image Data Interpolation first determines the shift invariant locations for the color filter mosaic array. The shift invariant function and its second derivative at the corresponding shift invariant locations are calculated. The color values of the shift invariant points are then calculated from the adjacent color element data and the calculated second order derivative. The interpolated values at the four corners of each color element is optionally averaged to calculate the interpolated values for each color element to correct for the systematic errors introduced by the Shift Invariant Differential Interpolation.

While this invention has been particularly shown and described with reference to the preferred embodiments thereof, it will be understood by those skilled in the art that various changes in form and details may be made without departing from the spirit and scope of the invention.

The invention claimed is:
1. A device comprising:
an array of image sensors configured to sense light corresponding to an image; and
an image processing device configured to determine a second order derivative of light intensity associated with an interstitial space between a subset of the image sensors based on average illumination values for multiple subsets of the image sensors, and to determine color data for the interstitial space between the subset of the image sensors based on the light sensed by the image sensors and the second order derivative.

2. The device of claim 1, wherein the image processing device is further configured to determine the average illumination values associated with interstitial spaces between the multiple subsets of the image sensors.

3. The device of claim 1, wherein the image processing device is further configured to determine differences between the average illumination values associated with adjacent interstitial spaces from different subsets of the image sensors, and to determine the second order derivative of light intensity based on the determined differences in average illumination values.

4. The device of claim 1, wherein the image processing device is further configured to determine color data for the interstitial space between the subset of the image sensors based on the light sensed by the image sensors, the second order derivative, and at least one of the average illumination values.

5. The device of claim 1, wherein the interstitial space between the subset of image sensors is a shift invariant point of the array.

6. The device of claim 1, wherein the image processing device is configured to ascertain shift invariant points in the array based on a geometry of the array and to determine color data for the shift invariant points in the array.

7. The device of claim 1, wherein the subset of the image sensors is a Bayer pattern of sensors.

8. A method comprising:
sensing, by an imaging device, light corresponding to an image;
determining, by the imaging device, a second order derivative of light intensity associated with an interstitial space between a subset of image sensors based on average illumination values for multiple subsets of the image sensors; and
determining, by the imaging device, color data for the interstitial space between the subset of the image sensors based on the light sensed by the image sensors and the second order derivative.

9. The method of claim 8, further comprising determining, by the imaging device, the average illumination values associated with interstitial spaces between the multiple subsets of the image sensors.

10. The method of claim 8, further comprising determining, by the imaging device, differences between the average illumination values associated with adjacent interstitial spaces from different subsets of the image sensors, wherein the determining of the second order derivative of light intensity is based on the determined differences in average illumination values.

11. The method of claim 8, wherein the determining of the color data for the interstitial space between the subset of the image sensors is based on the light sensed by the image sensors, the second order derivative, and at least one of the average illumination values.

12. The method of claim 8, wherein the interstitial space between the subset of image sensors is a shift invariant point of the array.

13. The method of claim 8, further comprising:
ascertaining, by the imaging device, shift invariant points in the array based on a geometry of the array; and
determining, by the imaging device, color data for the shift invariant points in the array.

14. The method of claim 8, wherein the subset of the image sensors is a Bayer pattern of sensors.

15. An apparatus including a memory device storing instructions configured to cause a processing device to perform operations comprising:
averaging light intensity values sensed by multiple subsets of image sensors associated with interstitial points between each subset of the image sensors;
determining differences between the averaged light intensity values associated with adjacent interstitial spaces from different subsets of the image sensors; and
determining color data for the interstitial spaces between each subset of the image sensors based on the light intensity values sensed by the image sensors and the determined differences between the averaged light intensity values associated with adjacent interstitial spaces from different subsets of the image sensors.

16. The apparatus of claim 15, wherein the instructions are further configured to cause the processing device to perform operations comprising determining second order derivatives of light intensity associated with the interstitial spaces based on the determined differences between the averaged light intensity values associated with adjacent interstitial spaces from different subsets of the image sensors.

17. The apparatus of claim 16, wherein the determining of the color data for the interstitial spaces between each subset of the image sensors is based on the light intensity values sensed by the image sensors and the second order derivatives.

18. The apparatus of claim 15, wherein the interstitial spaces between the subsets of image sensors are shift invariant points of an array of the image sensors.

19. The apparatus of claim 15, wherein the instructions are further configured to cause the processing device to perform operations comprising:
ascertaining shift invariant points in an array of the image sensors based on a geometry of the array; and
determining the color data for the shift invariant points in the array.

20. The apparatus of claim 15, wherein the instructions are further configured to cause the processing device to perform operations comprising prompting the image sensors to sense light corresponding to an image.

* * * * *

UNITED STATES PATENT AND TRADEMARK OFFICE
CERTIFICATE OF CORRECTION

PATENT NO. : 8,310,724 B2
APPLICATION NO. : 13/231897
DATED : November 13, 2012
INVENTOR(S) : Dosluoglu It is certified that error appears in the above-identified patent and that said Letters Patent is hereby corrected as shown below:

On the Title Page, Item (56), under "OTHER PUBLICATIONS", in Column 2, Line 2, delete "hppt:" and insert -- http: --, therefor.

On the Title Page, in the Figure, delete " " and insert -- --, therefor. 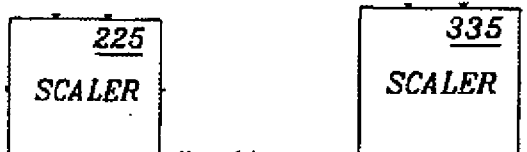

On Title Page 2, Item (56), under "OTHER PUBLICATIONS", in Column 1, Line 2, delete "hppt:" and insert -- http: --, therefor.

On Title Page 2, Item (56), under "OTHER PUBLICATIONS", in Column 2, Line 8, delete "Fusio," and insert -- Fusion, --, therefor.

On Title Page 2, Item (56), under "OTHER PUBLICATIONS", in Column 2, Line 12, delete "ol 4," and insert -- vol. 4, --, therefor.

In the Drawings

In Fig. 6, Sheet 8 of 15, delete " " and insert -- --, therefor. 

Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,310,724 B2

In the Specifications

In Column 3, Line 49, delete "THEN $I(n-k,m-l)=T[a*X1(n-k,m-l)+b*X2(n-k,m-l)+c*X3(n-k,m-l)+X4(n-k,m-l)]$" and insert -- THEN $I(n-k,m-l)=T[a*X1(n-k,m-l)+b*X2(n-k,m-l)+c*X3(n-k,m-l)+d*X4(n-k,m-l)]$ --, therefor.

In Column 3, Line 63, delete "pattern." and insert -- pattern; --, therefor.

In Column 4, Line 3, delete "$I((2*(i-x)-1), (2*(j-y)-1))$" and insert -- $I((2^*(i-x)-1), (2^*(j-y)-1))$ --, therefor.

In Column 4, Line 34, delete "$B=I_{C2}(2i+3,2j-1)+I_{C1}(2i+3,2j+1)+I_{C3}(2i-1,2j-3)+I_{C1}(2i-1,2j-3)$" and insert -- $B=I_{C2}(2i+3,2j-1)+I_{C1}(2i+3,2j+1)+I_{C3}(2i+1,2j-3)+I_{C1}(2i-1,2j-3)$ --, therefor.

In Column 4, Line 51, delete "$\frac{\overline{(I(2i,2j))}''}{Scale\_Sharp\_Smooth}$" and insert -- $\frac{\overline{(I(2i,2j))}''}{Scale\_Sharp\_Smooth}$ --, therefor.

In Column 5, Line 6, delete "$I_c((2*(i-x)-2), (2*(j-y)-2))$" and insert -- $I_c((2^*(i-x)-2), (2^*(j-y)-2))$ --, therefor.

In Column 7, Line 55, delete "element" and insert -- element. --, therefor.

In Column 9, Line 27, delete "$I((2*(i-x)-1), (2*(j-y)-1))$" and insert -- $I((2^*(i-x)-1), (2^*(j-y)-1))$ --, therefor.

In Column 10, Line 3, delete "$= (I(2i-2, 2j-2) + I(2i+2, 2j+2)) - 2*I(2i, 2j)$" and insert -- $= (I(2i-2, 2j-2) + I(2i+2, 2j+2)) - 2*I(2i, 2j)$ --, therefor.

In Column 10, Line 7, delete "$= (I(2i+2, 2j-2) + I(2i-2, 2j+2)) - 2*I(2i, 2j)$" and insert -- $= (I(2i+2, 2j-2) + I(2i-2, 2j+2)) - 2*I(2i, 2j)$ --, therefor.

CERTIFICATE OF CORRECTION (continued)
U.S. Pat. No. 8,310,724 B2

In Column 10, Line 17, delete "$-2 * I(2i, 2j)$" and insert -- $-2^{*} I(2i, 2j)$ --, therefor.

In Column 10, Line 57, delete "$2 * [(\text{Average Peripheral Pixels})$" and insert -- $2^{*} [(\text{Average Peripheral Pixels})$ --, therefor.

In Column 11, Line 19, delete "$-2*I(2i,2j-2))$" and insert -- $-2*I(2i,2j-2)$ --, therefor.

In Column 11, Line 33, delete "$\dfrac{(2*(D) + E - 2*I(2i, 2j))}{6}$" and insert -- $\dfrac{(2^{*}(D) + E - 2*I(2i, 2j))}{6}$ --, therefor.

In Column 11, Line 49, delete "$4 * (I_{C4}(2i+1, 2j-1)$" and insert -- $4^{*} (I_{C4}(2i+1, 2j-1)$ --, therefor.

In Column 11, Line 50, delete "$\dfrac{(2*A) + B + C}{6}$" and insert -- $\dfrac{(2^{*}A) + B + C}{6}$ --, therefor.

In Column 12, Line 1, delete "$(-2 * (I(4, 4) + I(4, 0)$" and insert -- $(-2^{*} (I(4, 4) + I(4, 0)$ --, therefor.

In Column 12, Line 2, delete "$\dfrac{4 * I(2, 2)}{8}$" and insert -- $\dfrac{4^{*} I(2, 2)}{8}$ --, therefor.

In Column 13, Line 42, delete "I$_R$/B(3,1)" and insert -- I$_{R/B}$(3,1) --, therefor.

In Column 13, Line 44, delete "I$_R$/B(3,1)" and insert -- I$_R$(1,3) --, therefor.

In Column 13, Line 45, delete "(3,1)." and insert -- (1,3). --, therefor.

In Column 13, Line 62, delete "(I$_R$(2,2)" and insert -- I$_R$(2,2) --, therefor.

In Column 13, Line 66, delete "I$_R$/B(3,1)" and insert -- I$_{R/B}$(3,1) --, therefor.

In Column 14, Line 61, delete "$I_c((2*(i-x)-2), (2*(j-y)-2))$" and insert -- $I_c((2^*(i-x)-2), (2^*(j-y)-2))$ --, therefor.

In Column 15, Line 12, delete "printer)" and insert -- printer --, therefor.

In Column 17, Line 21, delete "410" and insert -- 410. --, therefor.

In Column 19, Line 32, delete "(L*" and insert -- L* --, therefor.